US009454716B2

(12) United States Patent
Tomiyasu et al.

(10) Patent No.: US 9,454,716 B2
(45) Date of Patent: Sep. 27, 2016

(54) IMAGE TRANSMISSION APPARATUS AND RECORDING MEDIUM

(71) Applicant: Konica Minolta, Inc., Chiyoda-ku, Tokyo (JP)

(72) Inventors: Kazuhiro Tomiyasu, Toyokawa (JP); Tomoko Maruyama, Toyokawa (JP); Kenichi Komaba, Toyokawa (JP); Ryosuke Nishimura, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 7 days.

(21) Appl. No.: 14/725,423

(22) Filed: May 29, 2015

(65) Prior Publication Data

US 2015/0347873 A1 Dec. 3, 2015

(30) Foreign Application Priority Data

May 29, 2014 (JP) ................. 2014-111583

(51) Int. Cl.
G06F 3/12 (2006.01)
G06K 15/00 (2006.01)
H04L 29/08 (2006.01)
G06K 15/02 (2006.01)

(52) U.S. Cl.
CPC ......... G06K 15/002 (2013.01); G06K 15/1803 (2013.01); H04L 67/1095 (2013.01)

(58) Field of Classification Search
None
See application file for complete search history.

(56) References Cited

U.S. PATENT DOCUMENTS 7,464,333 B2 * 12/2008 Yamamoto ........ G06F 17/30905 358/1.1
2012/0075311 A1 * 3/2012 Tomita ............... H04N 1/00408 345/473

FOREIGN PATENT DOCUMENTS

| JP | 2002368929 A | 12/2002 |
| JP | 2005101796 A | 4/2005 |
| JP | 2008259143 A | 10/2008 |
| JP | 2009290707 A | 12/2009 |
| JP | 2013125313 A | 6/2013 |

* cited by examiner

Primary Examiner — Marivelisse Santiago Cordero
Assistant Examiner — Neil R McLean
(74) Attorney, Agent, or Firm — Cantor Colburn LLP

(57) ABSTRACT

An image transmission apparatus which transmits image data comprises an operation part displaying an operation screen and receiving a user operation on the operation screen and a processor for controlling a display content in the operation screen. The operation screen has a destination specifying area used for displaying a plurality of options which are candidates of destinations of the image data and receiving a specifying operation for specifying the destinations by using the plurality of options and a number display area used for displaying the number of the destinations specified by the specifying operation. The processor displays a destination list area used for listing the destinations specified by the specifying operation, together with the destination specifying area and the number display area, in the operation screen under the condition that a specific operation which is an operation on the number display area is received.

23 Claims, 24 Drawing Sheets

| DESTINATION SPECIFICATION ORDER NUMBER | DESTINATION IDENTIFICATION NUMBER | DESTINATION NAME | DISPLAY FLAG |
|---|---|---|---|
| 01 | 002 | FGH ELECTRIC | 0 |
| 02 | 003 | KLMN MACHINE | 0 |
| 03 | 004 | PQR CHEMICAL | 0 |
| 04 | 008 | EFG DEVELOPMENT | 0 |
| 05 | 009 | HIJ ELECTRIC | 0 |

| DESTINATION SPECIFICATION ORDER NUMBER | DESTINATION IDENTIFICATION NUMBER | DESTINATION NAME | DISPLAY FLAG |
|---|---|---|---|
| 01 | 002 | FGH ELECTRIC | 1 |
| 02 | 003 | KLMN MACHINE | 1 |
| 03 | 004 | PQR CHEMICAL | 1 |
| 04 | 008 | EFG DEVELOPMENT | 1 |
| 05 | 009 | HIJ ELECTRIC | 1 |
| 06 | 022 | PPP ELECTRIC | 0 |
| 07 | 023 | QQQ MACHINE | 0 |

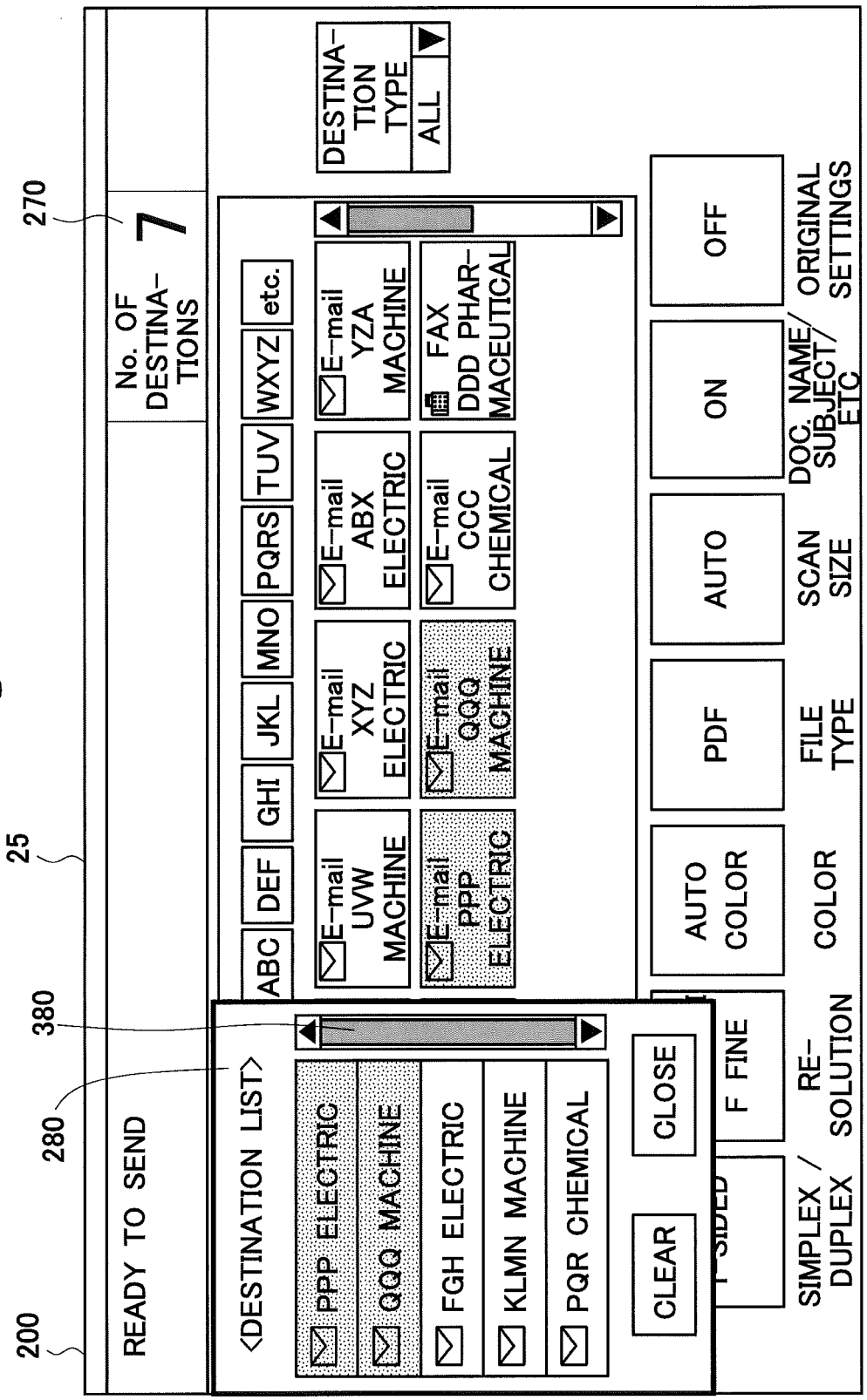

IMAGE TRANSMISSION APPARATUS AND RECORDING MEDIUM

The present invention claims priority under 35 U.S.C. §119 to Japanese Application No. 2014-111583 filed on May 29, 2014, the entire content of which is incorporated herein by reference.

BACKGROUND OF THE INVENTION

1. Field of the Invention

The present invention relates to an image transmission apparatus such as an MFP (Multi-Functional Peripheral) or the like, and its relevant technique.

2. Description of the Background Art

In an image transmission by an MFP, a multi-address (multi-destination) transmission in which an image is transmitted simultaneously to a plurality of destinations (addresses) is sometimes performed. In more detail, a destination specifying area is displayed on a touch panel for operation in an MFP. In the destination specifying area, a plurality of options corresponding to a plurality of destinations, respectively, are arranged in alignment in one row or a plurality of rows. An operator finds a plurality of desired options among the plurality of options and sequentially presses a plurality of buttons corresponding to the plurality of desired options, to thereby perform an operation for specifying the plurality of desired options as destinations. Then, the operator presses a start button or the like, to thereby transmit an image.

Further, recent MFPs have various image transmission functions. For example, there are image transmission functions such as an image transmission by facsimile, transmission of image data attached to an E-mail, and the like. Especially, the recent MFPs can transmit one piece of image data through one transmission operation by specifying a plurality of above various destinations in the multi-destination transmission, and in such a case, the number of destinations tends to particularly increase.

In such a case, using wrong destinations in the image transmission (wrong transmission) should be avoided. When a large number of destinations are to be specified, however, such wrong transmission is particularly liable to occur.

As a technique to suppress occurrence of such wrong transmission, there is a technique for displaying a destination list in which specified destinations are listed (see, for example, Japanese Patent Application Laid Open Gazette No. 2008-259143 (Patent Document 1) and Japanese Patent Application Laid Open Gazette No. 2002-368929 (Patent Document 2)).

Patent Documents 1 and 2, however, disclose techniques in each of which a destination list is always displayed in a destination specifying area. In the case where a destination list is always displayed in a destination specifying area, at least one of the area for the destination list and the destination specifying area has to be reduced, and sufficiently effective use of display space is not necessarily made. Further, when it is intended to ensure a certain degree of size or more of the destination specifying area, a display area for the destination list decreases and characters of the destinations become smaller. As a result, it becomes hard to check the destinations and disadvantageously, the effect of suppressing the wrong transmission is remarkably reduced.

Further, while the higher model of MFP is provided with a relatively large operation panel, the lower model thereof is provided with a relatively small operation panel, due to requirements for cost reduction and the like, in most cases. Especially, in the case where the destination list is always displayed in the destination specifying area in the lower model of MFP or the like, the destination list is liable to be displayed relatively small and therefore the wrong transmission is liable to occur.

SUMMARY OF THE INVENTION

It is an object of the present invention to provide an image transmission apparatus capable of displaying a destination specifying area and a destination list while effectively using a display space in an operation screen, and of suppressing wrong transmission well, and its relevant technique.

The present invention is intended for an image transmission apparatus which transmits image data. According to a first aspect of the present invention, the image transmission apparatus includes an operation part displaying an operation screen and receiving a user operation on the operation screen and a processor for controlling a display content in the operation screen, and in the image transmission apparatus of the present invention, the operation screen has a destination specifying area used for displaying a plurality of options which are candidates of destinations of the image data and receiving a specifying operation for specifying the destinations by using the plurality of options and a number display area used for displaying the number of the destinations specified by the specifying operation, and the processor displays a destination list area used for listing the destinations specified by the specifying operation, together with the destination specifying area and the number display area, in the operation screen under the condition that a specific operation which is an operation on the number display area is received.

The present invention is also intended for a non-transitory computer-readable recording medium. According to a second aspect of the present invention, the non-transitory computer-readable recording medium records therein a computer program to be executed by a computer embedded in an image transmission apparatus which transmits image data, to cause the computer to perform the steps of a) displaying an operation screen on an operation part of the image transmission apparatus, the operation screen having a destination specifying area used for displaying a plurality of options which are candidates of destinations of the image data and receiving a specifying operation for specifying the destinations by using the plurality of options and a number display area used for displaying the number of the destinations specified by the specifying operation, b) receiving a specific operation which is an operation on the number display area, and c) displaying a destination list area used for listing the destinations specified by the specifying operation, together with the destination specifying area and the number display area, in the operation screen under the condition that the specific operation is received.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a flowchart showing an operation for displaying a destination list area, and the like;

FIGS. 13 and 14 are views each showing display controlling data;

FIG. 15 is a view showing the destination setting screen in which the destination list area is displayed;

FIG. 18 to 20 are views each showing the destination setting screen in which the destination list area in small size is displayed;

FIG. 24 is a view showing a destination setting screen in accordance with the fifth preferred embodiment; and FIG. 25 is a view showing the destination setting screen in which the destination list area is displayed.

DESCRIPTION OF THE PREFERRED EMBODIMENTS

Hereinafter, the preferred embodiments of the present invention will be described with reference to figures.

<1. The First Preferred Embodiment>

<1-1. Overall Configuration>

Figure 1:
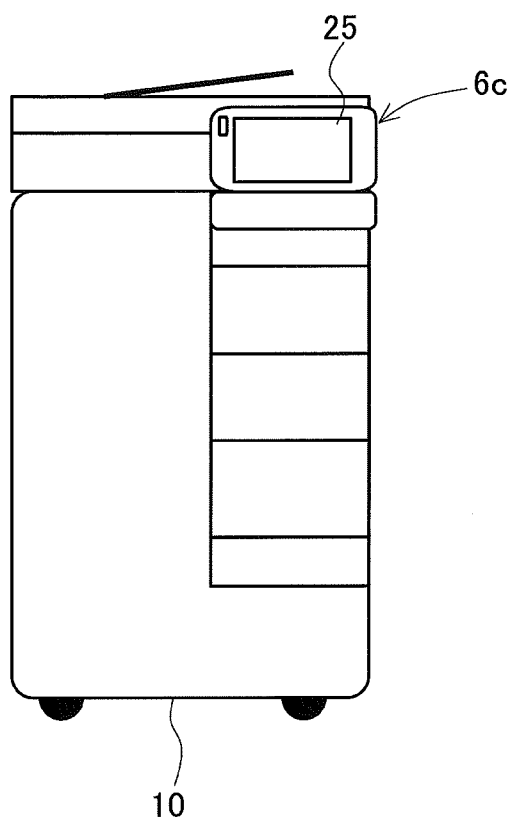
FIG. 1 is a view showing an appearance of an image transmission apparatus.
Figure 2:
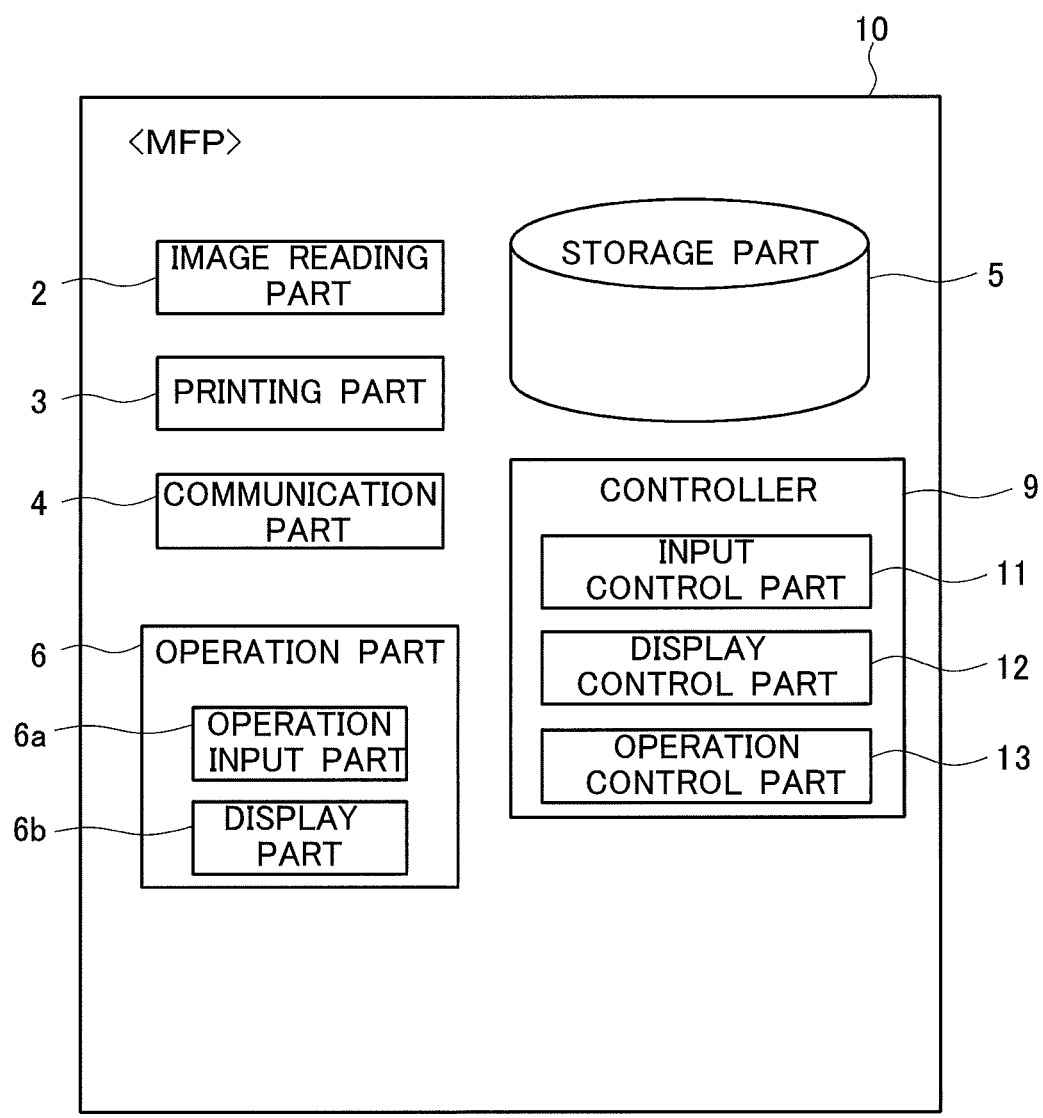
FIG. 2 is a view showing functional blocks of the image transmission apparatus.

FIG. 1 is a view showing an appearance of an image transmission apparatus 10, and FIG. 2 is a view showing functional blocks of the image transmission apparatus 10. Herein, as an example of the image transmission apparatus 10, shown is an MFP (Multi-Functional Peripheral).

The MFP 10 is an apparatus (also referred to as a multifunction machine) having a scanner function, a copy function, a facsimile function, a box storage function, and the like. Specifically, as shown in the functional block diagram of FIG. 2, the MFP 10 comprises an image reading part 2, a printing part 3, a communication part 4, a storage part 5, an operation part 6, a controller (control part) 9, and the like and multiply uses these constituent parts to implement various functions.

The image reading part 2 is a processing part which optically reads an original manuscript placed on a predetermined position of the MFP 10 and generates image data of the original manuscript.

The printing part 3 is an output part which prints out an image to various media such as paper on the basis of the data on an object to be printed. The printing part 3 is capable of printing out an electronic document file stored in the storage part 5.

The communication part 4 is a processing part capable of performing facsimile communication via public networks or the like. Further, the communication part 4 is capable of performing network communication via a network. The network communication uses various protocols such as TCP/IP (Transmission Control Protocol/Internet Protocol) and the like. By using the network communication, the MFP 10 can transmit and receive various data to/from desired partners.

The storage part 5 is a storage unit such as a hard disk drive (HDD) or/and the like. The storage part 5 stores therein data relevant to printing jobs and the like.

The operation part 6 comprises an operation input part 6a for receiving an operation input which is given to the MFP 10 and a display part 6b for displaying various information thereon.

In the MFP 10, provided is a substantially plate-like operation panel part 6c (see FIG. 1). Further, the operation panel part 6c has a touch panel 25 on a front side thereof (see FIG. 1). The touch panel 25 is a liquid crystal display panel in which a piezoelectric sensor or the like is embedded, and is capable of displaying various information and receiving an operation input from an operator. On the touch panel 25, for example, displayed are various operation screens (including button images and the like). By pressing buttons which are virtually arranged in the touch screen 25, the operator can set various operations of the image transmission apparatus 10, or the like. Thus, the touch panel 25 displays the operation screen and receives a user operation on the operation screen. In other words, the touch panel 25 serves as part of the display part 6b and also serves as part of the operation input part 6a.

The controller 9 is a control unit for generally controlling the MFP 10. The controller 9 is a computer system which is embedded in the MFP 10 and comprises a CPU, various semiconductor memories (RAM and ROM), and the like. The controller 9 causes the CPU to execute a predetermined software program (hereinafter, referred to simply as a program) stored in the ROM (e.g., EEPROM), to thereby implement various processing parts. Further, the program (in more detail, program module group) may be recorded in various portable recording media (in other words, various non-transitory computer-readable recording media) such as a USB memory or the like and read out from the recording medium to be installed in the MFP 10. Alternatively, the program may be downloaded via a network 108 or the like to be installed in the MFP 10.

Specifically, as shown in FIG. 2, the controller 9 executes the program, to thereby implement various processing parts including an input control part 11, a display control part 12, and an operation control part 13.

The display control part 12 is a processing part for controlling a display content on the display part 6b. The display control part 12 controls an operation for displaying various information (including a preview image and the like described later) on the touch panel 25, and the like.

The input control part 11 is a processing part for controlling a receiving operation of the operation input on the operation input part 6a from the user, and the like.

The operation control part 13 is a processing part for controlling various operations (such as a scan operation, a printing operation, and the like).

<1-2. Operation>

Figure 3:
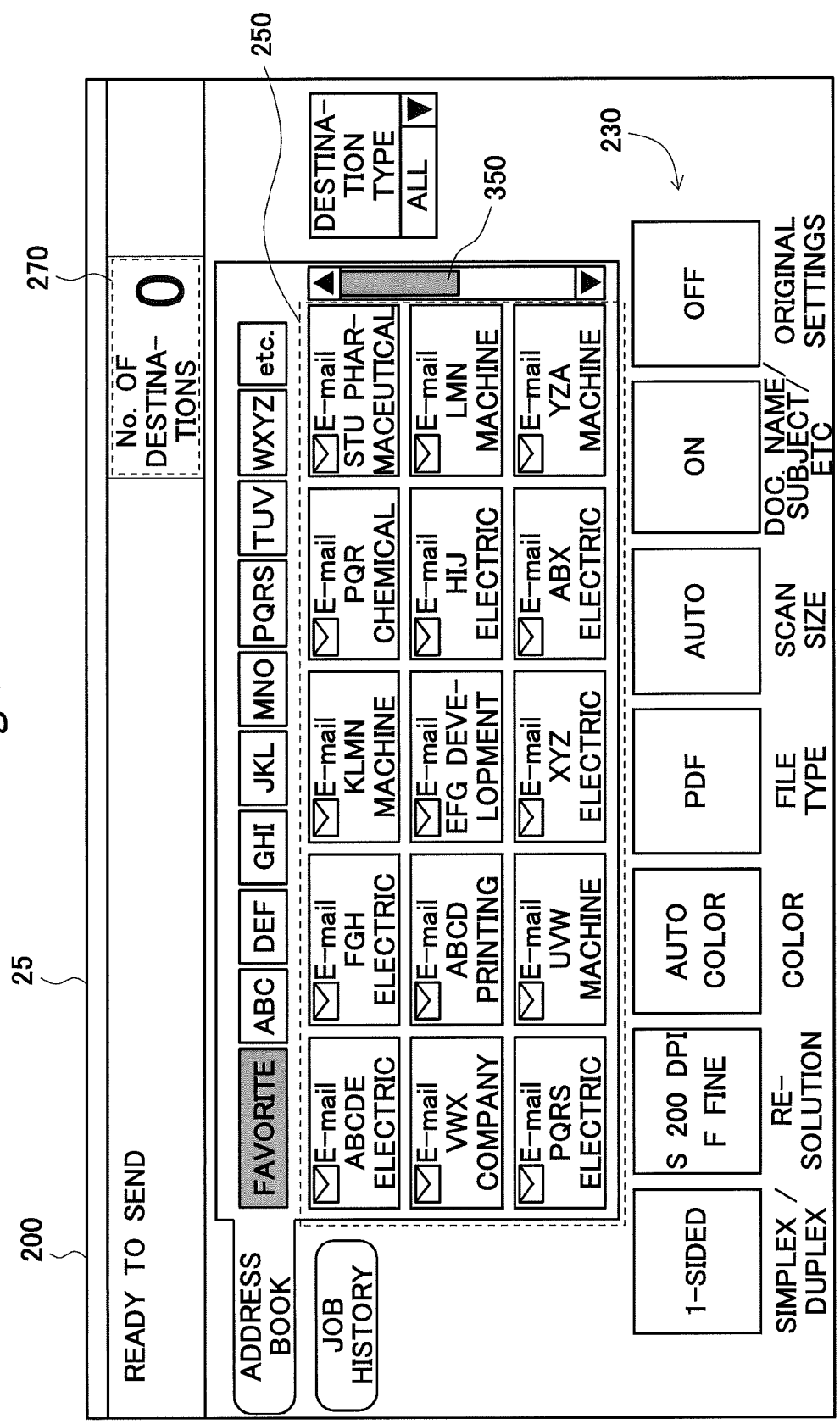
FIG. 3 is a view showing an operation screen (destination setting screen) displayed on a touch panel.

FIG. 3 is a view showing an operation screen (in more detail, a destination setting screen for a scan image) 200 displayed on the touch panel 25. Image data is transmitted to a destination (send target) specified in the operation screen 200. As exemplary transmission processes for the image data, shown are a facsimile transmission process via a facsimile line (telephone line), data transmission process using network communication, and the like. The data transmission process using network communication includes transmission of only image data through FTP (File Transfer Protocol), SMB (Server Message Block), or the like, and also includes transmission of image data attached to an E-mail, and the like.

The operation screen 200 shown in FIG. 3 has a destination specifying area 250 at a substantially central portion thereof (a lower area among two areas surrounded by broken lines in FIG. 3). The destination specifying area 250 is an area used for displaying a plurality of options which are candidates of destinations of image data and receiving a destination specifying operation for specifying the destinations by using the plurality of options, from the user. In other words, the destination specifying area 250 is an area in which a plurality of destination specifying buttons used for specifying the destinations of the image data are arranged. Further, the destination specifying button is also referred to as a destination selecting button or the like.

Herein, in the destination specifying area 250, fifteen destination specifying buttons are arranged (displayed), being divided into five rows in a lateral (left-and-right) direction and three rows (columns) in a longitudinal (up-and-down) direction. In the destination specifying area 250, fifteen destination specifying buttons can be arranged at the maximum at one point in time. To each of the destination specifying buttons, any one of a plurality of options which are registered in advance on the destinations is appropriately assigned. Further, as exemplary options on the destinations, shown are various destinations such as a destination (Fax No.) of facsimile transmission, a destination (mail address) of E-mail, a destination (IP address) of FTP, a destination (computer name and folder name) of SMB, and the like. Various destinations are displayed distinguishably by using characters representing the destination types (address types) ("Fax", "E-mail", "FTP", "SMB", and the like), icons, and/or the like. Further, each option on the destination may indicate a single destination or may be a group of a plurality of (the same type or different types of) destinations which are collectively registered as one destination.

In the destination specifying area 250, the options to be displayed therein can be changed through an operation (scroll operation) on a scroll bar 350. For example, all (or some) of the options being displayed in the destination specifying area 250 can be replaced by other options to be displayed, which are virtually present on the lower side of the destination specifying area 250. Similarly, all (or some) of the options being displayed in the destination specifying area 250 can be replaced by other options to be displayed, which are virtually present on the upper side of the destination specifying area 250. In other words, in the destination specifying area 250, a plurality of options (for example, 25 options) more than the maximum number (herein, 15) of options which can be displayed therein simultaneously at a point in time can be selectively displayed through a scroll display.

The operator finds a plurality of desired options among the plurality of options and sequentially presses a plurality of buttons corresponding to the plurality of desired options, to thereby perform an operation (destination specifying operation) for specifying the plurality of desired options as the destinations.

Further, the operation screen 200 has a plurality of detail setting call buttons 230 on the lower side of the destination specifying area 250. When each detail setting call button 230 is pressed, an individual detail setting screen corresponding to the pressed detail setting call button 230 is called out.

Figure 4:
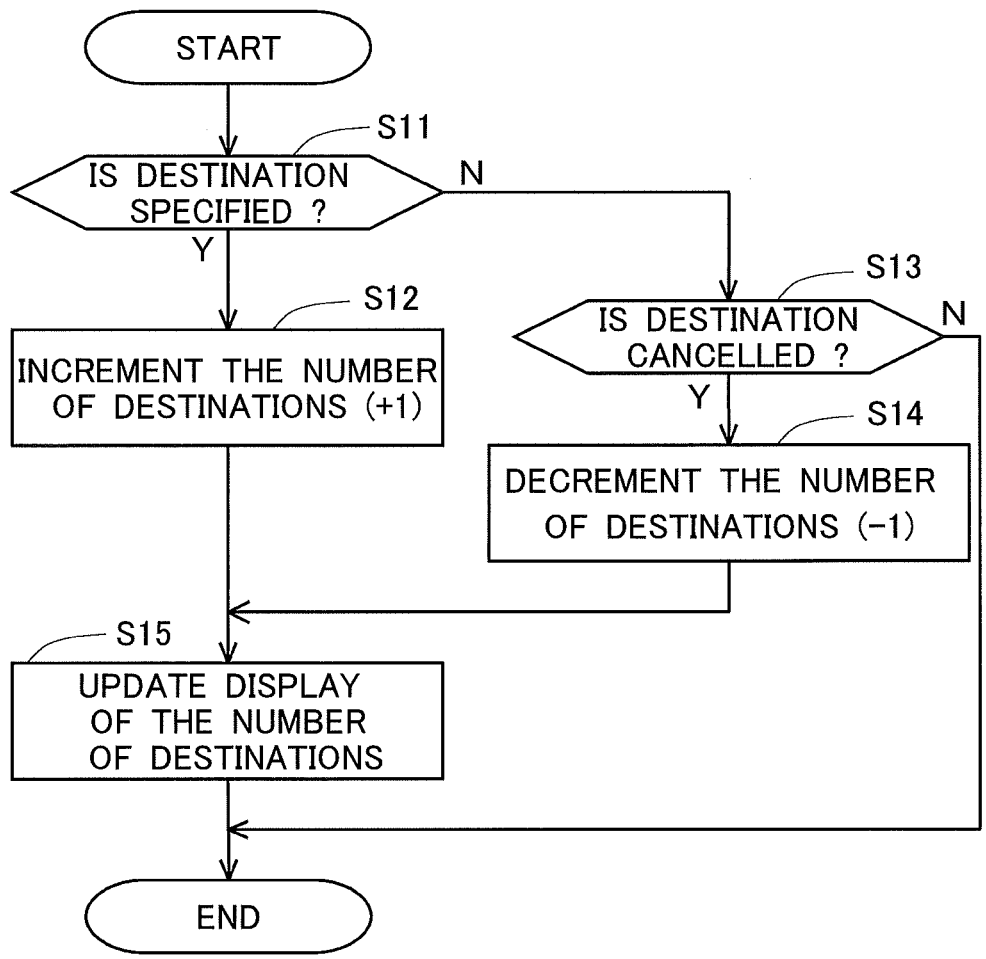
FIG. 4 is a flowchart showing an operation for displaying the number of destinations.

Furthermore, the operation screen 200 has a number display area 270 on the upper side of the destination specifying area 250 (an upper area among the two areas surrounded by broken lines in FIG. 3). The number display area 270 is an area used for displaying the number of destinations (addresses) for the transmission process of the image data. In the number display area 270, the number of options specified as the destinations among the plurality of options, on the basis of the operation on the destination specifying area 250, is displayed as the number of destinations. FIG. 4 is a flowchart showing an operation for displaying the number of destinations (destination number display operation).

In more detail, as shown in FIG. 4, when one of the plurality of destination specifying buttons displayed in the destination specifying area 250 is pressed and the option corresponding to the pressed destination specifying button is newly specified as the destination ("YES" in Step S11), the number of destinations is incremented by one (Step S12). Then, in Step S15, the number of destinations after update (after increment) is displayed in the number display area 270. Further, the color of the destination specifying button is changed from a normal color (for example, blue) to a highlight color (for example, red).

Conversely, when the destination specifying button which is already specified as the destination is further pressed ("YES" in Step S13), the option corresponding to the pressed destination specifying button is excluded from the destinations. Specifically, the destination specification on the option corresponding to the pressed destination specifying button is cancelled. At that time, the number of destinations is decremented by one (Step S14). Then, in Step S15, the number of destinations after update (after decrement) is displayed in the number display area 270. Further, the color of the destination specifying button is changed from the highlight color to the normal color.

Figure 5:
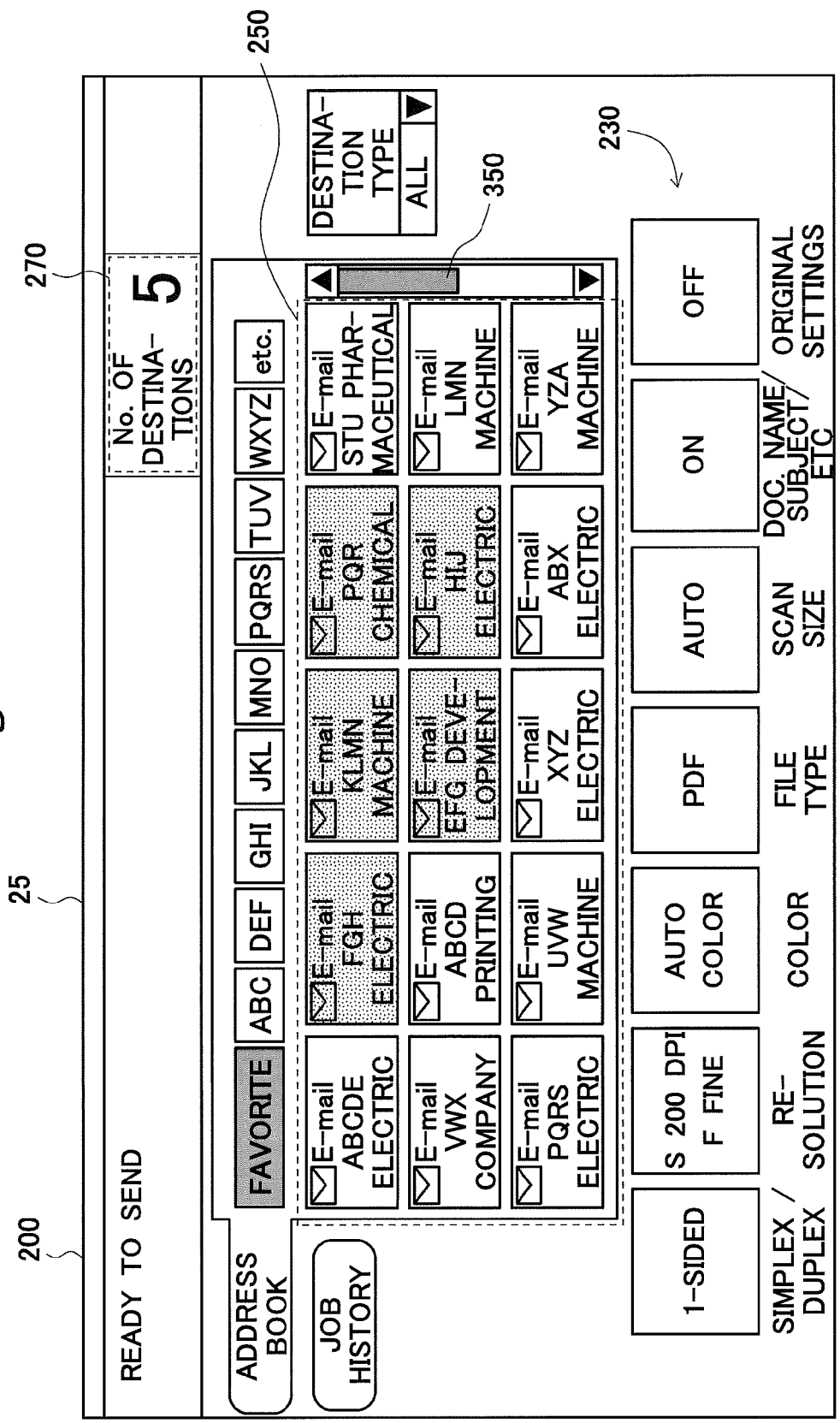
FIG. 5 is a view showing the destination setting screen in which five options are specified.

Thus, a plurality of options can be specified as the destinations in the destination specifying area 250. Further, FIG. 5 shows a state in which five options (the options which are sand-hatched in FIG. 5) are specified as the destinations in response to such a specifying operation.

In the present preferred embodiment, the operator can display (pop up) a destination list area 280 (pop-up display) by pressing the number display area 270. Specifically, the MFP 10 displays the destination list area 280 (see FIG. 7 and the like) in the operation screen 200 under the condition that the user operation (press operation or the like) on the number display area 270 is received. The destination list area 280 is an area used for displaying a list for checking the destinations specified by the operation on the destination specifying area 250, and also referred to as a destination check area or the like.

Figure 6:
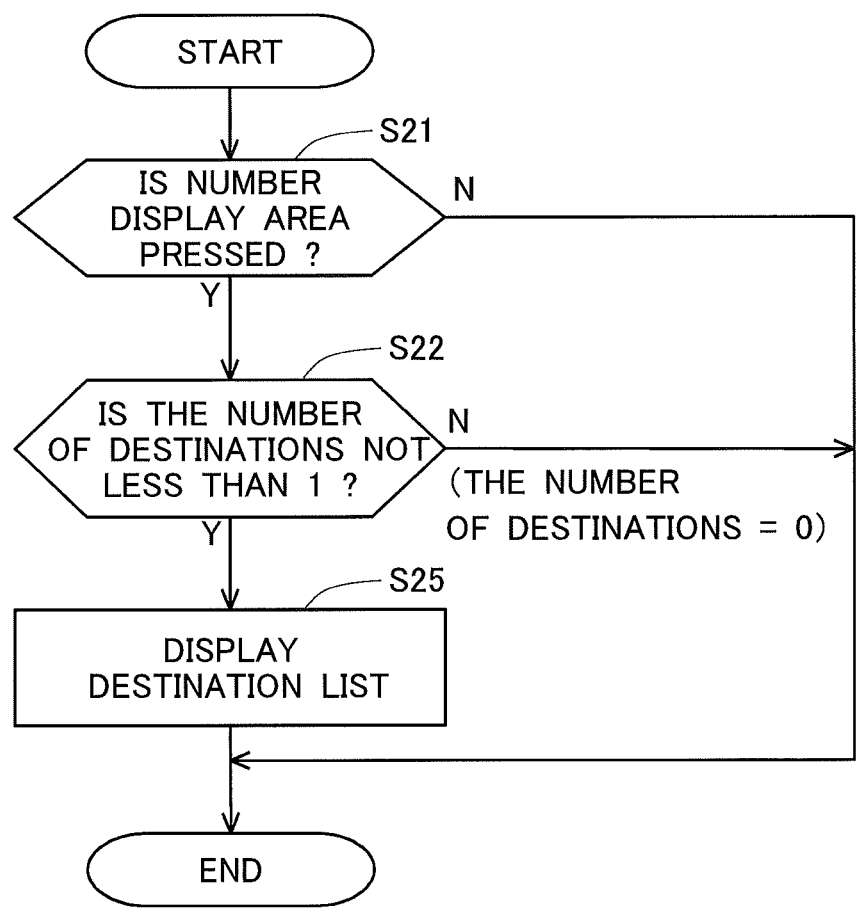

FIG. 6 is a flowchart showing an operation for displaying the destination list area 280, and the like.

As shown in FIG. 6, when the number display area 270 is pressed by the user, the process goes from Step S21 to Step S22, and the MFP 10 determines whether the number of specified destinations (the number of specified options) is zero or not less than 1.

Figure 7:
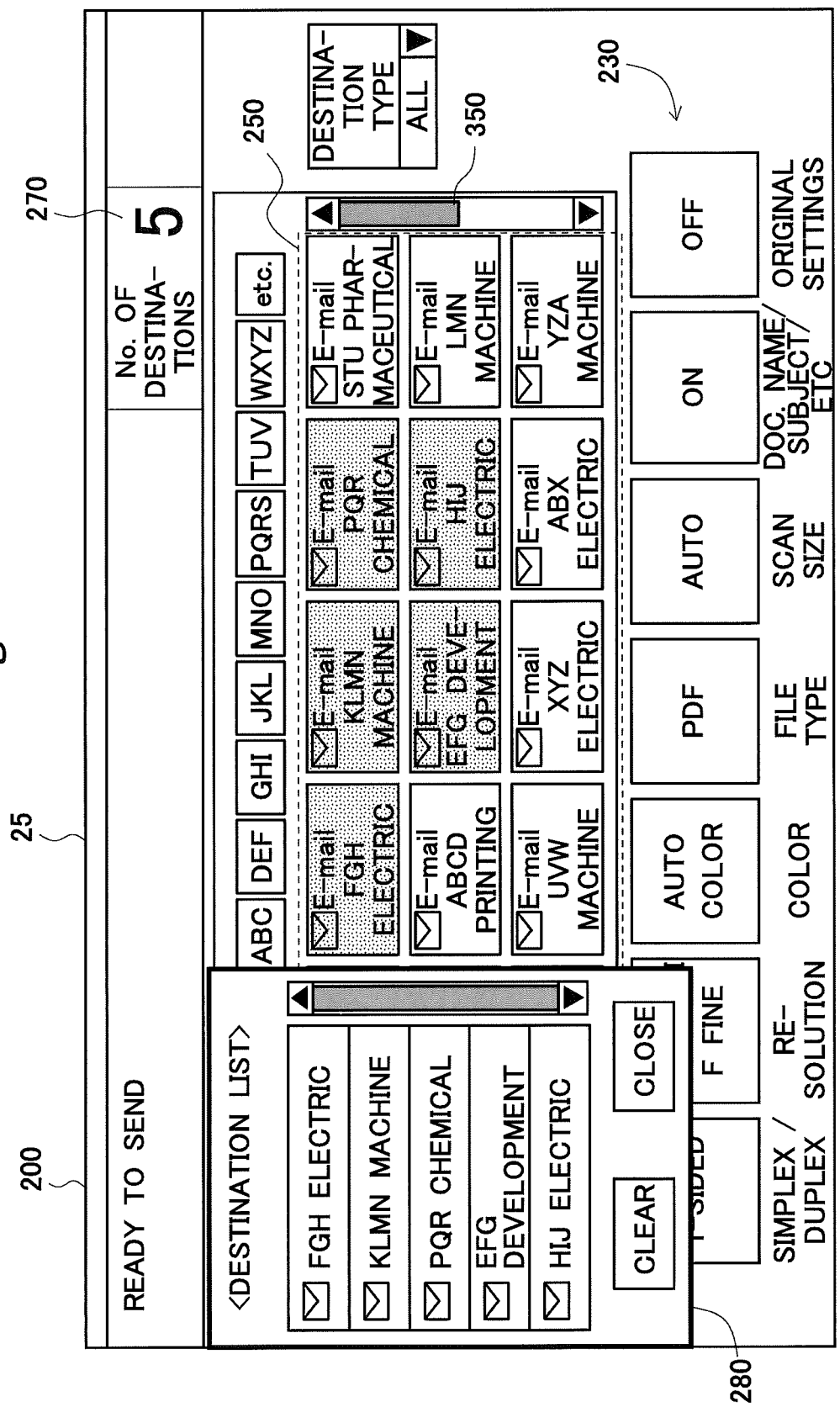
FIG. 7 is a view showing the destination setting screen in which the destination list area is displayed.

When the number of specified options is not less than 1, the MFP 10 displays (pops up) the destination list area 280 in the operation screen 200 (pop-up display) (Step S25). Specifically, in response to the user operation on the number display area 270, the destination list area 280 is displayed at a predetermined position of the operation screen 200. As shown in FIG. 7, for example, the destination list area 280 is displayed in the operation screen 200, being partially (or entirely) superimposed on the destination specifying area 250. In this case, however, in order not to cover the destination specifying area 250 as much as possible, the destination list area 280 is displayed, being drawn to the left end of the operation screen 200 (in more detail, by mainly using an area adjacent to the left end of the destination specifying area 250). Further, in the destination list area 280, one or more specified options are displayed in prescribed reference order (for example, in specification order). Further, the destination list area 280 is closed in response to the press operation of the "close" button provided therein, and then the original operation screen 200 (FIG. 5) is displayed again.

On the other hand, when the number of specified options is zero, the MFP 10 does not display the destination list area 280 in the operation screen 200. In other words, when the number of specified options is zero, even if the user operation on the number display area 270 is received, the MFP 10 does not display the destination list area in the operation screen.

Further, after the process of appropriately displaying the destination list area 280, or the like, is thus performed, the user visually checks the display content in the destination list area 280. Then, after the user confirms that all the destinations are correct, the user presses the start button (not shown) provided on the operation panel part 6c, to thereby cause the MFP 10 to start a transmission operation of the image.

In the above-described manner, since the destination list area 280 is not displayed in principle (see FIG. 5) during the actual destination specifying operation using the destination specifying area 250, the destination specifying operation can be performed by using the destination specifying area 250 which is arranged in a relatively wide space in the operation screen 200. Further, when the destination specifying operation is completed (or temporarily halted) and so on, if the user presses the number display area 270, the destination list area 280 is displayed in the operation screen 200 (see FIG. 7). In other words, when the user intends to check the destinations, by pressing the number display area 270 at the desired point in time, the user can cause the destination list area 280 to be displayed. Thus, it is possible to display the destination specifying area and the destination list by effectively using the display space in the operation screen.

Especially, the destination list area 280 is displayed at a desired timing of the user, not always. For this reason, the destination list area 280 can be displayed, being partially (or entirely) superimposed on the destination specifying area 250, and therefore can be displayed with no necessity of reduction in its size (in a relatively large size). Therefore, it is possible to display the destination list area 280 in an easy-to-see manner, and further possible to suppress wrong transmission well.

Further, the number display area 270 is used not only as a display area of the number of destinations but also as a display instruction receiving area (in other words, a destination list display instruction button) for the destination list area 280. In other words, the number display area 270 has both a destination number display function and a display instruction receiving function for the destination list area 280. Therefore, it is possible to further effectively use the display space of the touch panel 25, as compared with the case where a dedicated area is provided for each function. Especially in a case where the touch panel 25 is relatively small, while it is sometimes hard to ensure the space to provide a dedicated destination list display instruction button separately from the number display area 270, the above-described preferred embodiment can solve such a problem. Further, if the dedicated destination list display instruction button is provided separately from the number display area 270, the user needs to find the dedicated button in the operation screen 200. On the other hand, in the above-described preferred embodiment, since the display area of the number of destinations serves as the destination list display instruction button, the user can easily check the destinations which are the specific contents indicated by the number of destinations by performing such an intuitive operation as pressing the easy-to-see number display area 270.

Thus, in the above-described preferred embodiment, it is possible to display the destination list area 280 in an easy-to-see manner by effectively using the display space of the touch panel 25 and well suppress wrong transmission.

Further, the present invention is not limited to the above-described manner, but, for example, the destination list area 280 may be displayed unconditionally in response to the user operation on the number display area 270, not depending on the number of specified options in the destination specifying area 250.

Furthermore, though the destination list area 280 is displayed, being drawn to the left end of the operation screen 200 in the above-described preferred embodiment, the present invention is not limited to this case. For example, the destination list area 280 may be displayed, being drawn to the right end of the operation screen 200, or being drawn to the upper end or the lower end of the operation screen 200. Moreover, the destination list area 280 may be displayed entirely in the operation screen 200. From the viewpoint that the destination list area 280 and the destination specifying area 250 are concurrently used, however, it is preferable to display the destination list area 280 in such a position as not to cover the larger part (for example, more than half) of the destination specifying area 250.

<2. The Second Preferred Embodiment>

The second preferred embodiment is a variation of the first preferred embodiment. Description will be made below, centering on the difference between the first and second preferred embodiments.

In the above-described first preferred embodiment, described is the case where the destination list area 280 is unconditionally displayed in response to the user operation on the number display area 270 when the number of specified options in the destination specifying area 250 is not less than 1.

In the present second preferred embodiment, description will be made on an exemplary case where the destination list area 280 is displayed in response to the user operation on the number display area 270 when the number of specified options in the destination specifying area 250 is not less than 1 and a further condition is satisfied. Specifically, the further condition to be imposed is that one or any of the plurality of specified options is not displayed in the destination specifying area 250 at the point in time when an operation of pressing the number display area (number area press operation) is received.

Figure 8:
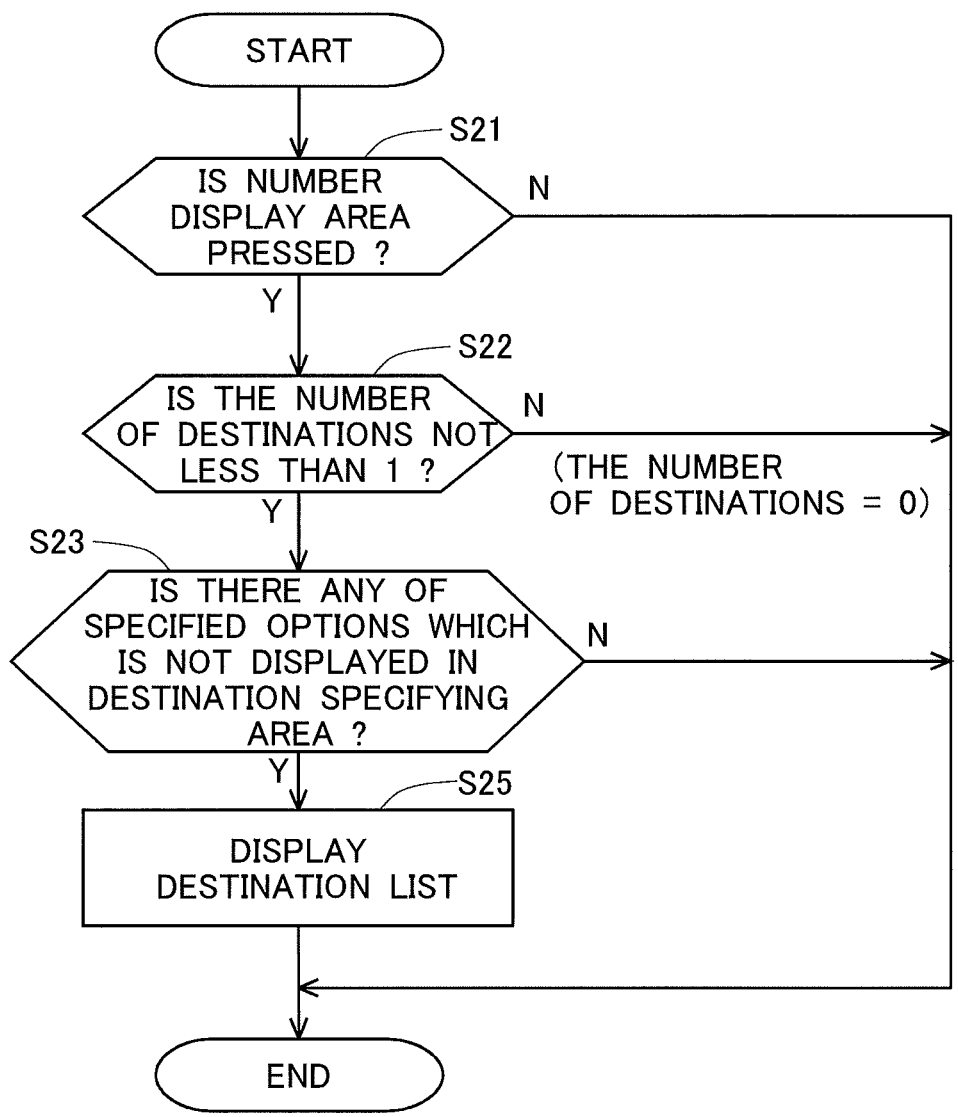
FIG. 8 is a flowchart showing an operation for displaying a destination list area, and the like, in accordance with a second preferred embodiment.

FIG. 8 is a flowchart showing an operation for displaying the destination list area, and the like, in accordance with the second preferred embodiment.

Steps S21 and S22 are the same as those of the operation for displaying the destination list area in accordance with the first preferred embodiment (FIG. 6).

In Step S22, however, when it is determined that the number of specified options is not less than 1, the process goes to Step S23. In Step S23, the MFP 10 determines whether or not all the specified options are displayed in the destination specifying area 250 (as any one of the fifteen destination specifying buttons at the maximum) at this point in time (at the point in time when the press operation on the number display area 270 is received).

When all the specified options are displayed in the destination specifying area 250 at the point in time when the number area press operation is received, the process shown in the flowchart of FIG. 8 is finished without executing Step S25. In other words, even if the user operation on the number display area 270 is received, the MFP 10 does not display the destination list area 280 in the operation screen 200.

As shown in FIG. 5, for example, when all the five specified options (the options which are sand-hatched in FIG. 5) are displayed in the destination specifying area 250, even if the number area press operation is received, the MFP 10 does not display the destination list area 280 in the operation screen 200.

Since all the specified options are displayed in the destination specifying area 250, the user can check all the specified options by visually checking the destination specifying area 250. In short, even if the destination list area 280 is not displayed, the user can check all the specified options. Further, by not displaying the destination list area 280, it is possible to prevent the display of the destination list area 280 from covering other displays (unspecified options in the destination specifying area 250, and the like).

On the other hand, when at least one of the specified options is not displayed in the destination specifying area 250 at the point in time when the number area press operation is received, the process goes from Step S23 to Step S25, and the destination list area 280 is displayed in the operation screen 200. In other words, the MFP 10 displays the destination list area 280 in the operation screen 200 in response to the user operation on the number display area 270.

Figure 9:
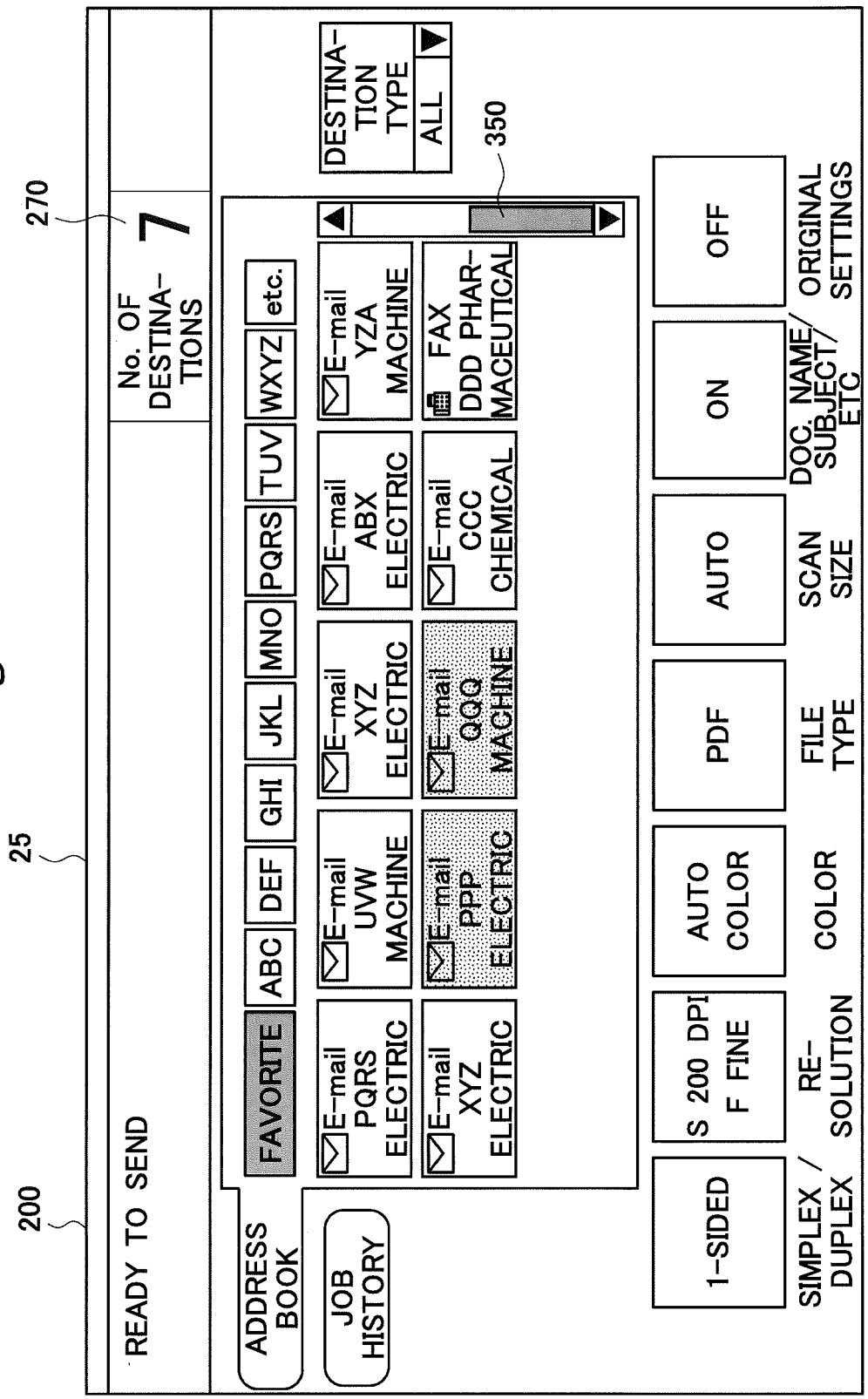
FIG. 9 is a view showing the destination setting screen in which another two options are specified after a scroll display.

As shown in FIG. 9, for example, now considered is a situation where in addition to the above-described five specified options (see FIG. 5), the two more options are specified as the destinations among another group of options displayed in the destination specifying area 250 in response to the scroll operation on the scroll bar 350. In this situation, when the number area press operation is performed, it is determined that any ones of the seven specified options (specifically, the above-described five specified options) are not displayed in the destination specifying area 250 at the point in time when the user operation is performed. Then, in response to the user operation on the number display area 270, the destination list area 280 is displayed in the operation screen 200 (see FIG. 10).

Figure 10:
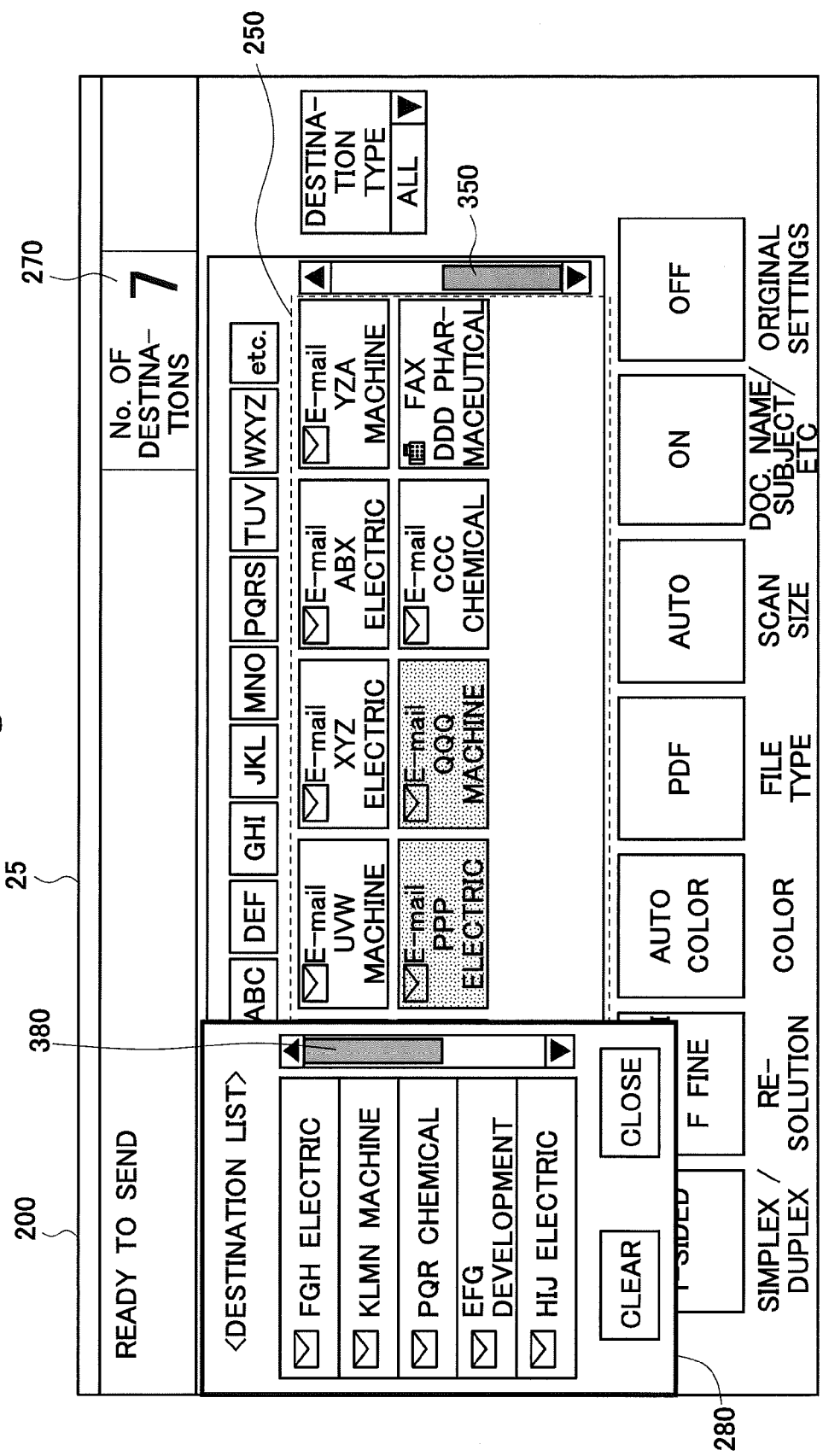
FIG. 10 is a view showing a state in which the destination list area is displayed in response to a press of a number display area in the operation screen of FIG. 9.
Figure 11:
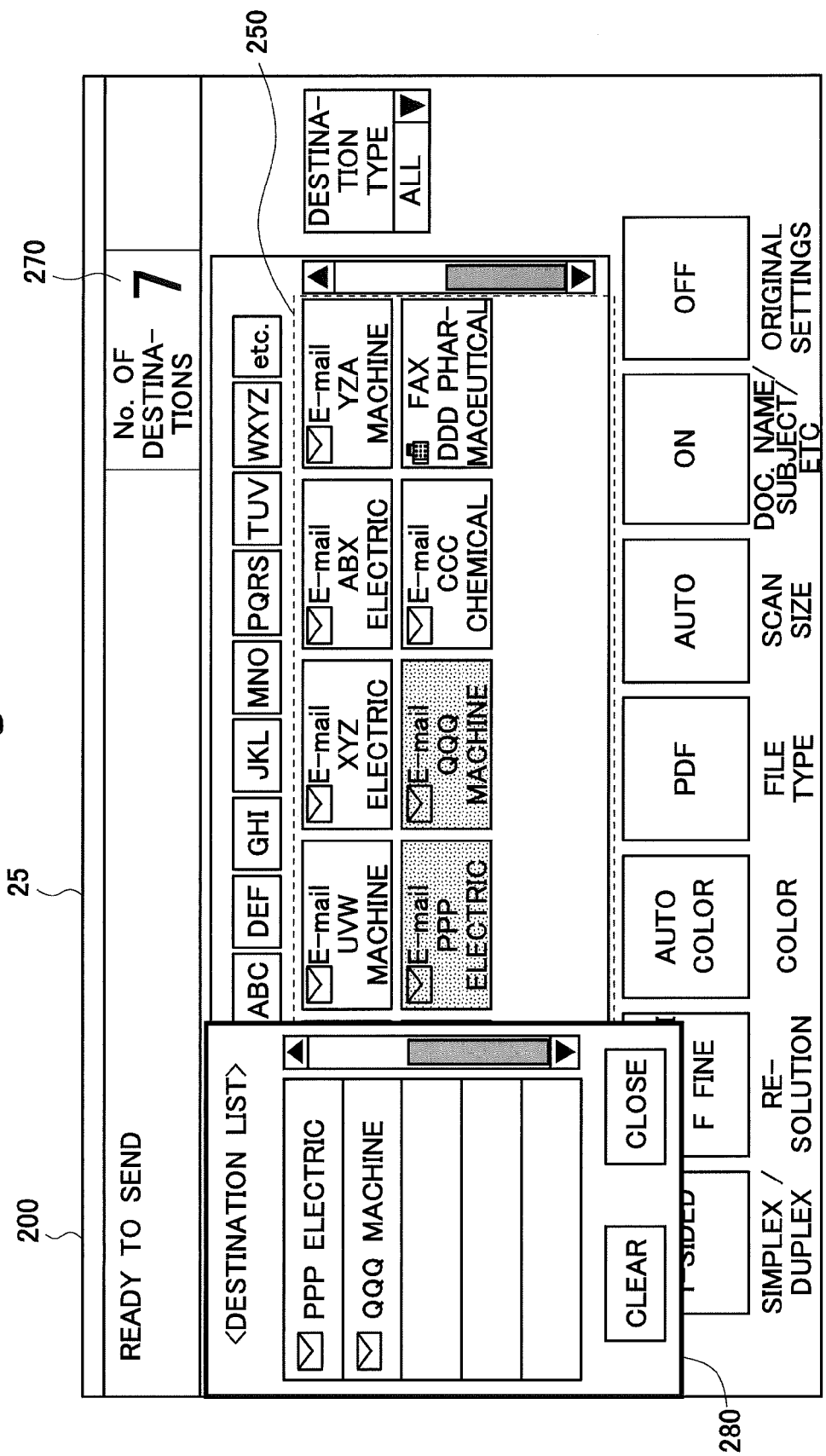
FIG. 11 is a view showing a state in which a destination list in the destination list area of FIG. 10 is scroll displayed.

In the destination list area 280 of FIG. 10, among the seven specified options, the high-order five specified options ("FGH Electric", . . . , and "HIJ Electric") in specification order are initially displayed. Further, by operating a scroll bar 380 in the destination list area 280, the display of the destination list in the destination list area 280 is scrolled. As shown in FIG. 11, the remaining two specified options ("PPP Electric" and "QQQ Machine") can be thereby displayed in the destination list area 280.

Thus, the destination list area 280 may be displayed under the condition that the number of specified options in the destination specifying area 250 is not less than 1 and one or at least one of the plurality of specified options is not displayed in the destination specifying area 250.

Further, the present invention is not limited to the above-described manner, but, for example, also if the number of specified options in the destination specifying area 250 is zero, the destination list area 280 may be displayed in response to the user operation on the number display area 270.

<3. The Third Preferred Embodiment>

The third preferred embodiment is a variation of the first and second preferred embodiments. In the third preferred embodiment, a variation on the display order in the destination list area 280 will be described. Description will be made below, centering on the difference between the first and third preferred embodiments.

In the above-described preferred embodiments, described is the case where the specified options are listed in the destination list area 280 in the same order as the specification order. In the present third preferred embodiment, in a case where the destination list area 280 is displayed a plurality of times, the destinations which are not displayed yet in the previous and foregoing destination list areas 280 at a point in time are displayed preferentially (for example, on the top side of the list). In other words, when the destination list area once becomes non-displayed and then becomes displayed again, an option which is not listed yet (until the point in time when the previous display of the destination list area 280 is made) in the destination list area among the specified options is preferentially displayed. Such a manner will be described below.

Figure 12:
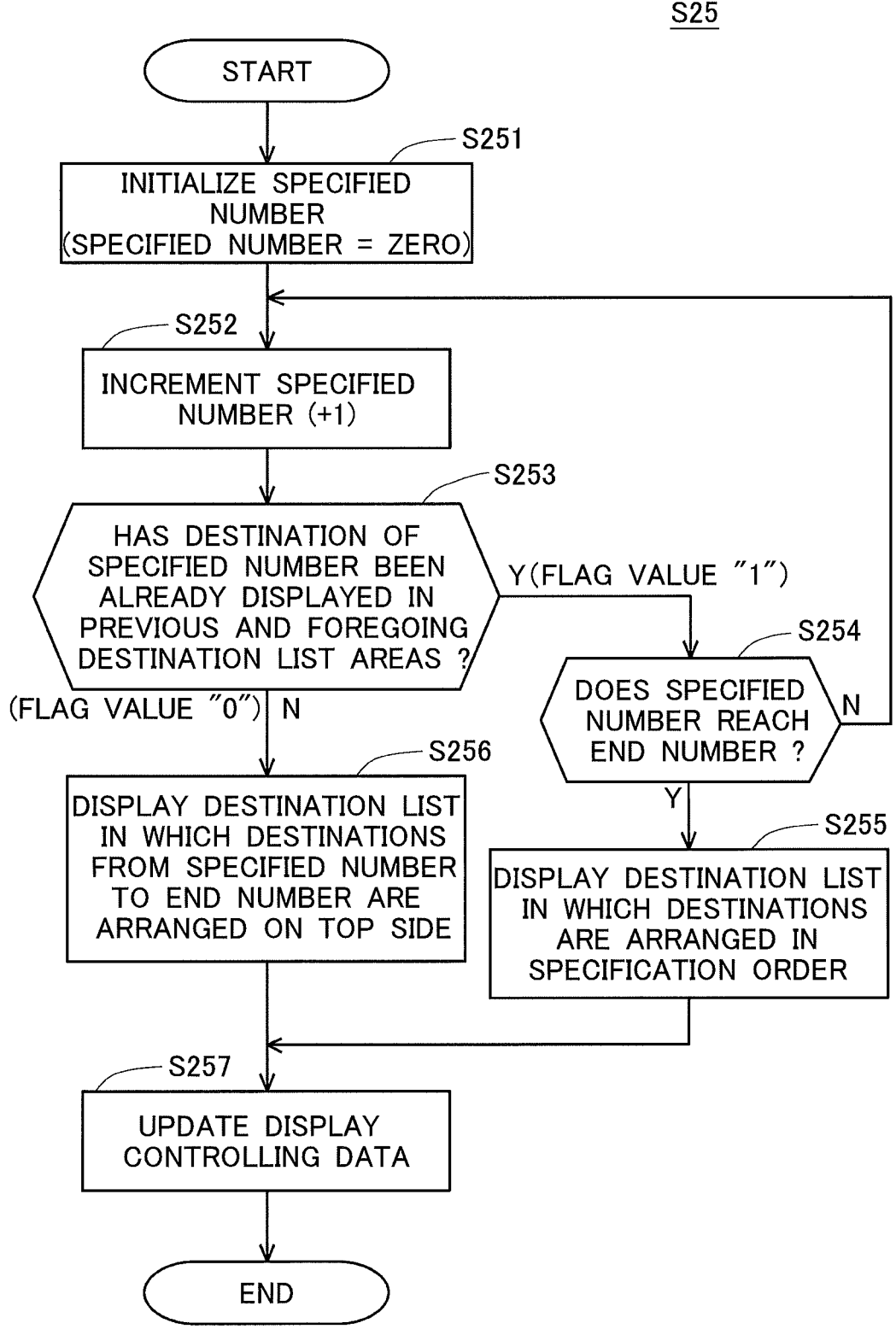
FIG. 12 is a flowchart showing an operation for displaying the destination list in accordance with a third preferred embodiment.

FIG. 12 is a flowchart showing such an operation for displaying the destination list. FIG. 12 shows an operation executed in Step S25 (see FIGS. 6 and 8). Further, FIGS. 13 and 14 are views each showing display controlling data 400. In the display controlling data 400, data on a plurality of destinations specified in the destination specifying area 250 are registered sequentially from top down in order of specification made in the destination specifying area 250. A record in each row has various information ("destination specification order number", "destination identification number", "destination name", and "display flag") on each destination. The "destination specification order number" is a number indicating the specification order of each destination, the "destination identification number" is an identification number for identifying each destination, and the "destination name" is a name of each destination. The "display flag" is flag information indicating whether or not each destination is already displayed in the destination list area 280. Further, FIGS. 13 and 14 show the display controlling data 400 at different points in time.

Herein, considered is a case where the following overall operation is performed. Specifically, first, in the destination specifying area 250 of the operation screen 200 shown in FIG. 3, five options are sequentially pressed and specified as the destinations (see FIG. 5). Next, in the operation screen 200 of FIG. 5, the number display area 270 is pressed and the destination list area 280 as indicated in FIG. 7 is once displayed, and then the "close" button in the destination list area 280 is pressed and the screen returns to the operation screen 200 shown in FIG. 5. After that, in response to the scroll operation on the scroll bar 350, another group of options shown in FIG. 9 is displayed in the destination specifying area 250. Then, in the state of FIG. 9, two options are newly specified as the destinations. Then, the number display area 270 is pressed again and the destination list area 280 is displayed again (see FIG. 15).

Description will be made below on the above operation in series.

Specifically, first, in the destination specifying area 250 of the operation screen 200 shown in FIG. 3, five options are sequentially pressed and specified as the destinations. FIG. 13 shows the display controlling data 400 at the point in time immediately after specification of the five options is completed.

In the first line of FIG. 13, the information on the destination "FGH Electric" which is specified first (specifically, the "destination specification order number"="01", the "destination identification number"="002", the "destination name"="FGH Electric", and the "display flag"="0") is recorded.

Hereinafter, similarly, the information on the destinations specified second to fifth ("KLMN Machine", "PQR Chemical", "EFG Development", and "HIJ Electric") are sequentially recorded.

Since any one of the five specified destinations is not displayed yet in the destination list area 280 at this point in time, the "display flag" on each of the five specified destinations is set to "0 (zero)" (indicating "undisplayed").

Next, when the number display area 270 is pressed in the operation screen 200, the process shown in FIG. 12 is performed. As a result, the destination list area 280 is once displayed in the operation screen 200, as shown in FIG. 7.

Specifically, first, a specified number is initialized in Step S251. Next, in Step S252, the specified number is incremented by 1 and set to "1", and the destination "FGH Electric" which has the "destination specification order number" of "01" which is the same as the specified number of "1" is set as a "specified destination".

Then, in Step S253, it is determined whether or not the specified destination has been already displayed in the previous and foregoing destination list areas 280. In detail, on the basis of whether or not the "display flag" of the specified destination is "1" (indicating "displayed"), it is determined whether or not the specified destination is an already-displayed destination. When the specified destination is a destination which has not been displayed yet in the previous and foregoing destination list areas 280, the process goes to Step S256 (described later). On the other hand, when the specified destination is a destination which has been already displayed in the previous and foregoing destination list areas 280, the process goes back to Step S252 through Step S254, and the same operation is repeated.

Thus, in Steps S252, 253, and S254, an operation for finding the youngest (smallest) undisplay number is performed.

At this point in time, since the "display flag" of the specified destination "FGH Electric" is "0", it is determined that the specified destination has not been displayed, and the process goes to Step S256.

In Step S256, the destination list in which the destinations from the specified number to the end number are arranged on the top side is displayed. Since the specified number="1" herein, however, the destination list in which the destinations are consequently arranged in original specification order is displayed.

Then, in Step S257, the display controlling data 400 is updated. Specifically, reflecting that the five specified destinations are displayed in the destination list area 280, the "display flag" of each of the five specified destinations is changed from "0" to "1". Further, the destinations displayed in the destination list area 280 are regarded as the destinations which have been checked by the user.

After that, the user presses the "close" button in the destination list area 280 (see FIG. 7). In response to this press operation, the destination list area 280 once becomes non-displayed, and the operation screen 200 shown in FIG. 5 is displayed again on the touch panel 25.

Further, in response to the scroll operation on the scroll bar 350, another group of options shown in FIG. 9 is displayed in the destination specifying area 250.

Then, in the state of FIG. 9, other two options ("PPP Electric" and "QQQ Machine") are sequentially pressed and newly specified as the destinations. FIG. 14 shows the display controlling data 400 at the point in time immediately after specification of the two options is completed.

In the sixth line of FIG. 14, the information on the destination "PPP Electric" which is specified sixth (specifically, the "destination specification order number"="06", the "destination identification number"="022", the "destination name"="PPP Electric", and the "display flag"="0") is recorded.

In the seventh line of FIG. 14, the information on the destination "QQQ Machine" which is specified seventh (specifically, the "destination specification order number"="07", the "destination identification number"="023", the "destination name"="QQQ Machine", and the "display flag"="0") is recorded.

Further, the "display flag" of each of the destinations in the first to fifth lines of FIG. 14 has been changed from "0" to "1" as described above.

In this state, when the number display area 270 is pressed, the process shown in FIG. 12 is performed again. As a result, the destination list area 280 as shown in FIG. 15 is displayed at this time in the operation screen 200.

Specifically, first, a specified number is set to "1" in Steps S251 and S252, and the destination "FGH Electric" is set as the "specified destination". Then, in Step S253, on the basis of that the display flag of the specified destination is "1", it is determined that the specified destination has been already displayed in the previous and foregoing destination list areas 280, and the process goes back to Step S252 through Step S254. After that, the same operation is repeated while the specified number is incremented. Thus, in Steps S252 to 254, the operation for finding the youngest undisplay number is performed.

As a result, herein, on the basis of that the display flag of the destination "PPP Electric" having the specified number of "6" is "0", it is determined that the specified destination "PPP Electric" has not been displayed yet in the previous and foregoing destination list areas 280 (in other words, the youngest undisplay number is "6"), and the process goes to Step S256.

In Step S256, the destination list in which the destinations from the specified number to the end number are arranged on the top side of the list is displayed. Specifically, the destination list area 280 in which the destinations from the specified number "6" to the end number "7" are arranged on the top side from the other destinations (the destinations from number "1" to number "5") is displayed (see FIG. 15). In the destination list area 280 of FIG. 15, the destination "PPP Electric" which is the sixth one in specification order and the destination "QQQ Machine" which is the seventh one in specification order are arranged first and second of the destination list. On the third to fifth of the destination list, the destinations which are the first to third ones in specification order (in succession to the destinations which are the sixth to seventh ones in specification order) are listed.

Thus, when the destination list area 280 is displayed again, the undisplayed destinations (herein, "PPP Electric" and "QQQ Machine") can be preferentially displayed (on the top side of the list).

After that, the display controlling data 400 is updated in Step S257.

Further, the destination list area 280 shown in FIG. 15 is a destination list in which five destinations can be displayed at the maximum, and the destinations having the first to fifth display orders after the update of arrangement are displayed in the destination list area 280. In Step S257, the display flag of each of the destinations having the first to fifth display orders after the update of arrangement (and having the display flag of "0") is changed to "1".

The destinations having the sixth and later display orders after the update of arrangement are not displayed at the point in time when the display of the destination list area 280 is started, and will be displayed in response to the scroll operation on the scroll bar 380. When there is any destination which is displayed first in the destination list area 280 in response to the scroll operation, the display flag of the destination is changed from "0" to "1".

Thus, also as shown in FIG. 15, when the destination list area 280 is displayed again, since the undisplayed destinations (herein, "PPP Electric" and "QQQ Machine") are preferentially displayed (on the top side of the list), relatively easy check of the undisplayed destinations can be performed. In other words, it is possible to ensure more efficient check operation.

Further, in Step S254 of FIG. 12, it is determined whether or not the specified number reaches the end number (the number of specified destinations). When it is not determined that the specified number reaches the end number, the process goes back to Step S252. On the other hand, when it is determined in Step S254 that the specified number reaches the end number (in other words, that all the specified destinations have been listed), the process goes to Step S255. In Step S255, the destination list in which the destinations are arranged in registration order is displayed. For example, when the destination list area 280 is once displayed as shown in FIG. 7 and then the destination list area 280 becomes non-displayed as shown in FIG. 5 and the number display area 270 is pressed in this state, since all the "display flags" of the five destinations are each "1", the process goes to Step S255 of FIG. 12 and the destination list area 280 shown in FIG. 7 is displayed in the operation screen 200.

Further, in the above-described third preferred embodiment, when there is an undisplayed option at some midpoint in the arrangement of a plurality of options which are arranged in specification order, the options including the undisplayed option (specifically, from the undisplayed option to the last option) are preferentially displayed. Such a manner is especially effective in the case where undisplayed options are successively present after a certain position (particularly, near the bottom) in the arrangement of a plurality of options which are arranged in specification order. The present invention, however, is not limited to this case. For example, in a case where a plurality of undisplayed options are present at arbitrary positions (discretely) in the arrangement of a plurality of options which are arranged in specification order, the plurality of undisplayed options (a plurality of undisplayed options extracted out of the plurality of options) may be preferentially displayed. Further, the undisplayed options may be preferentially displayed, not depending on the specification order. In more detail, the plurality of undisplayed options may be arranged in any order other than the specification order, and the plurality of already-displayed options may be also arranged in any order other than the specification order.

<4. The Fourth Preferred Embodiment>

The fourth preferred embodiment is a variation of the first preferred embodiment. Description will be made below, centering on the difference between the first and fourth preferred embodiments.

In the fourth preferred embodiment, an exemplary manner in which the destination list area 280 is popped up and displayed in the operation screen 200 in response to the number area press operation by getting around areas in which the specified options are arranged in the destination specifying area 250 will be described in detail. In short, the destination list area 280 is so arranged as not to overlap the specified options. More specifically, the destination list area 280 is arranged (displayed) by using an area corresponding to one of the leftmost row and the rightmost row in the destination specifying area 250 which is arranged at a substantially central portion of the operation screen 200, in which no specified option is arranged, and an adjacent area thereof (an adjacent area adjacent to the outside (the left side or the right side) of the destination specifying area 250). Herein, the leftmost row among the leftmost row and the rightmost row is preferentially used, and the destination list area 280 is arranged therein.

Further, in the destination specifying area 250, the plurality of options are provided, being divided into a plurality of rows not less than three rows (herein, five rows). When the destination list area 280 is popped up and displayed, the destination list area 280 is so arranged always as not to overlap the central rows (the central three rows) other than the leftmost row and the rightmost row among the plurality of rows in the destination specifying area 250. Furthermore, the present invention is not limited to this case, but the plurality of options may be displayed, being divided into a plurality of rows less than three rows (for example, two rows).

Figure 16:
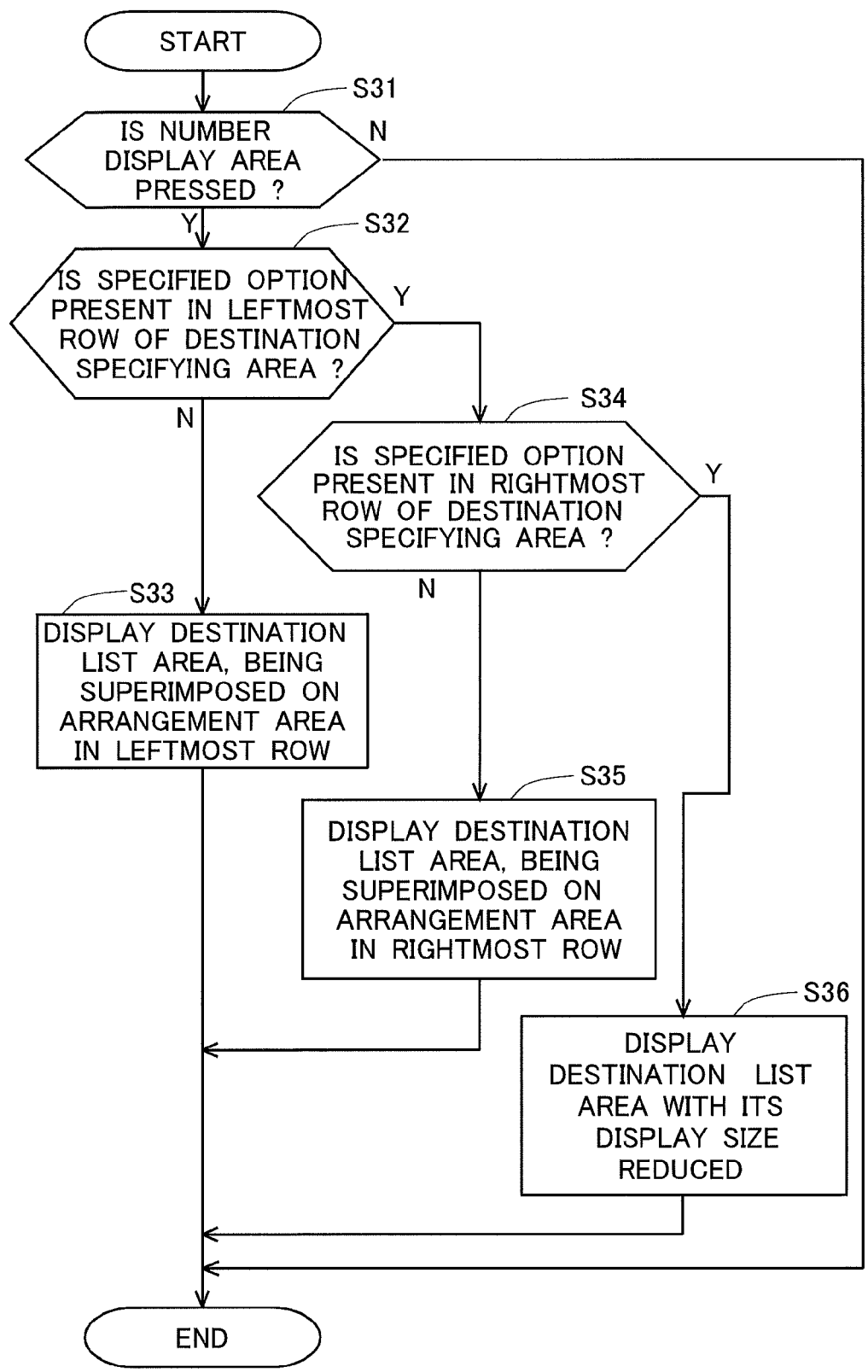
FIG. 16 is a flowchart showing an operation for displaying the destination list area, and the like, in accordance with a fourth preferred embodiment.

FIG. 16 is a flowchart showing an operation for displaying the destination list area, and the like, in accordance with the fourth preferred embodiment. In Step S31, the same determination process as that in Step S21 is performed. When the number display area 270 is pressed, the process goes from Step S31 to Step S32.

In Step S32, it is determined whether or not the specified options are arranged in the leftmost row of the destination specifying area 250.

When no specified option is arranged in the leftmost row of the destination specifying area 250, the process goes to Step S33, and the destination list area 280 is displayed, being superimposed on arrangement areas of the options in the leftmost row. In the state where the five options are selected as shown in FIG. 5, for example, when the number display area 270 is pressed, the destination list area 280 is so displayed as to overlap the destination specifying buttons ("ABCDE Electric", "VWX Company", and "PQRS Electric" (see FIG. 5)) on the three stages in a longitudinal direction in the leftmost row. In other words, the destination list area 280 is displayed by using an area in which no specified option is arranged in the destination specifying area 250. In detail, the destination list area 280 is displayed by using arrangement areas of the options in the leftmost row and an adjacent area adjacent to the destination specifying area 250 on the left end side.

On the other hand, when the specified option is arranged in the leftmost row of the destination specifying area 250, the process goes from Step S32 to Step S34.

In Step S34, it is determined whether or not the specified options are arranged in the rightmost row (opposite side) of the destination specifying area 250.

Figure 17:
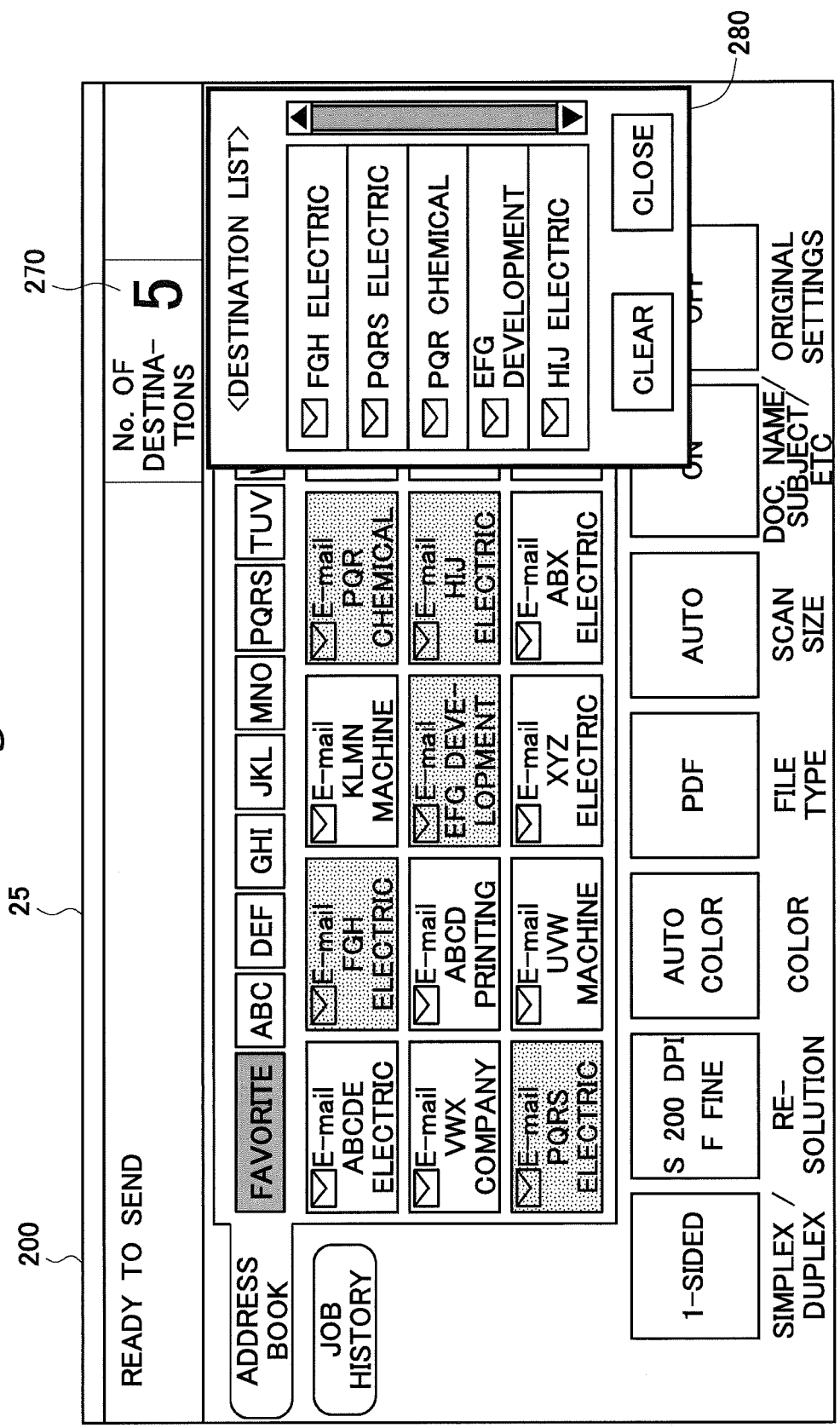
FIG. 17 is a view showing the destination setting screen in which the destination list area is displayed.

When no specified option is arranged in the rightmost row of the destination specifying area 250, the process goes to Step S35, and the destination list area 280 is displayed, being superimposed on arrangement areas of the options in the rightmost row of the destination specifying area 250. In the state where the five options are selected as shown in FIG. 17, for example, when the number display area 270 is pressed, the destination list area 280 is so displayed as to overlap the destination specifying buttons on the three stages in a longitudinal direction in the rightmost row, as shown in FIG. 17. In other words, the destination list area 280 is displayed by using an area in which no specified option is arranged in the destination specifying area 250. In detail, the destination list area 280 is displayed by using arrangement areas in the rightmost row and an adjacent area adjacent to the destination specifying area 250 on the right end side.

On the other hand, when the specified option is arranged also in the rightmost row of the destination specifying area 250 (in other words, the specified options are arranged in both the leftmost row and the rightmost row of the destination specifying area 250), the process goes to Step S36.

In Step S36, the destination list area 280 is displayed in the operation screen 200, with its display size reduced.

Figure 18:
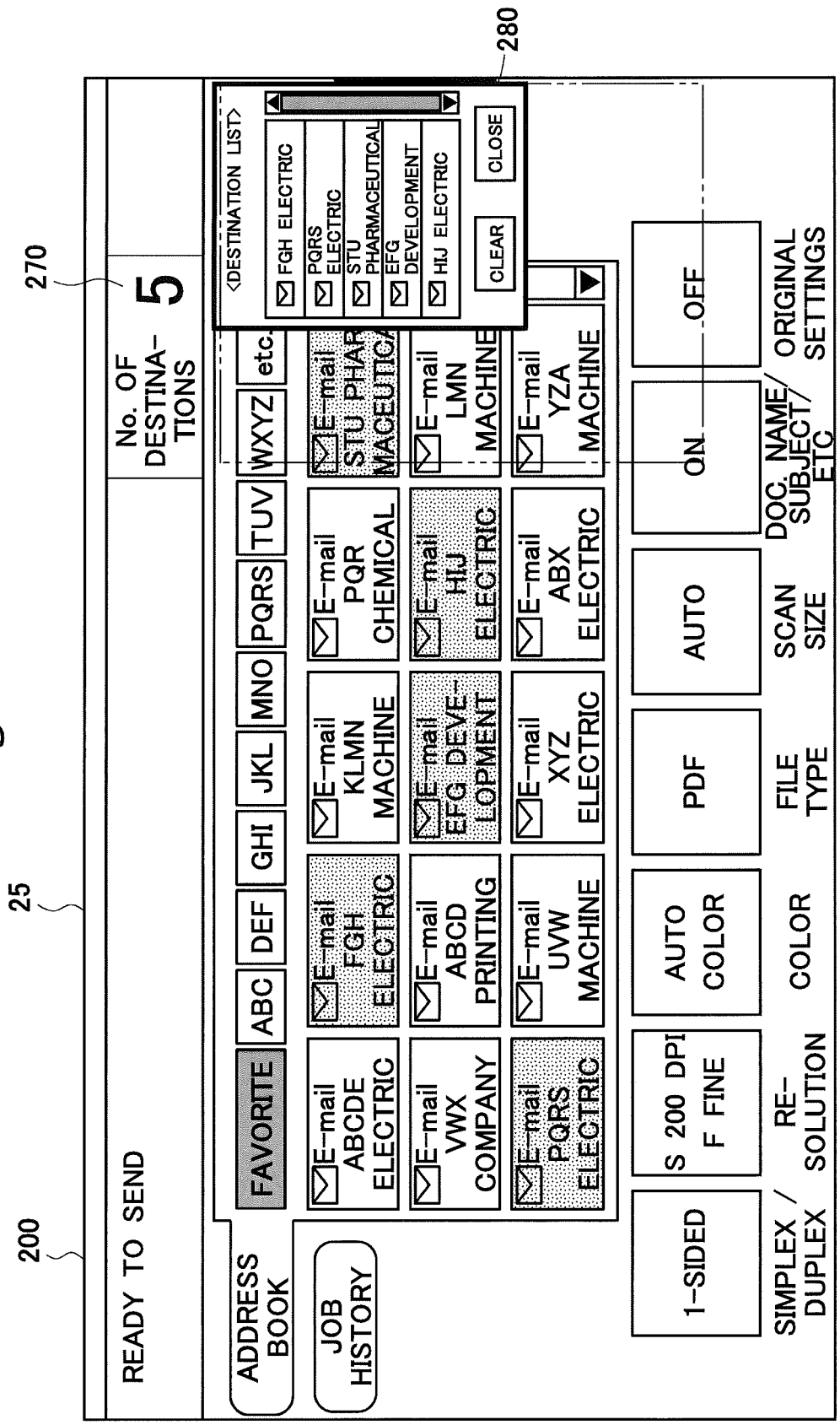

As shown in FIG. 18, for example, the destination list area 280 is displayed with its display size reduced to such a size as to avoid an effective display area (area in which characters indicating each option) of each option, especially an effective display area of each option in the rightmost row inside the destination specifying area 250. In FIG. 18, the destination list area 280 having a size smaller than that in FIGS. 7 and 17 is displayed. Herein, by downsizing the display content of the destination list area 280, the display size of the destination list area 280 is reduced. Further, in FIG. 18, the display size of the destination list area 280 in FIG. 17 is indicated by a two-dot chain line, for comparison. The same applies to FIGS. 19 and 20 described later.

In such a manner, when no specified option is arranged in one of the leftmost row and the rightmost row, since the destination list area 280 is so arranged as to avoid the areas in which the specified options are arranged (the central three rows, and the leftmost row or the rightmost row) in the destination specifying area 250, it is possible to prevent the destination list area 280 from covering the specified options. Therefore, the user can check the options which are specified by himself while visually checking both the destination list area 280 and the destination specifying area 250 (especially the specified options). Further, when the user finds a wrongly-specified option in the destination list area 280 and the destination specifying area 250, the user can also easily cancel the destination specification on the wrongly-specified option by pressing the wrongly-specified option again in the destination specifying area 250.

Furthermore, when no specified option is arranged in both the leftmost row and the rightmost row, the destination list area 280 is arranged by preferentially using the leftmost row. Therefore, while the destination list area 280 is favorably displayed in the leftmost row of the operation screen 200, the operator can appropriately perform additional specification of the options in the destination specifying area 250, and the like, with his right hand (the dominant hand of a right-handed operator). Especially, since the destination list area 280 is displayed in the leftmost row of the operation screen 200, it is possible to prevent the right hand of the operator from covering the destination list area 280 when the operator performs additional specification of the options with his right hand.

Though the exemplary case has been described herein where the destination list area 280 is displayed preferentially at a position on the left end side in the lateral direction (the position where the destination list area 280 is partially superimposed on the leftmost row) when no specified option is arranged in both the leftmost row and the rightmost row in this case, the present invention is not limited to this case. When no specified option is arranged in both the leftmost row and the rightmost row, for example, conversely, the destination list area 280 may be displayed preferentially at a position on the right end side in the lateral direction (the position where the destination list area 280 is partially superimposed on the rightmost row). With this technique, when a left-handed operator performs additional specification of the options with his left hand (dominant hand), it is possible to prevent the left hand of the operator from covering the destination list area 280. Further, whether the destination list area 280 is preferentially displayed on the left end side or on the right end side may be set for each user.

Figure 19:
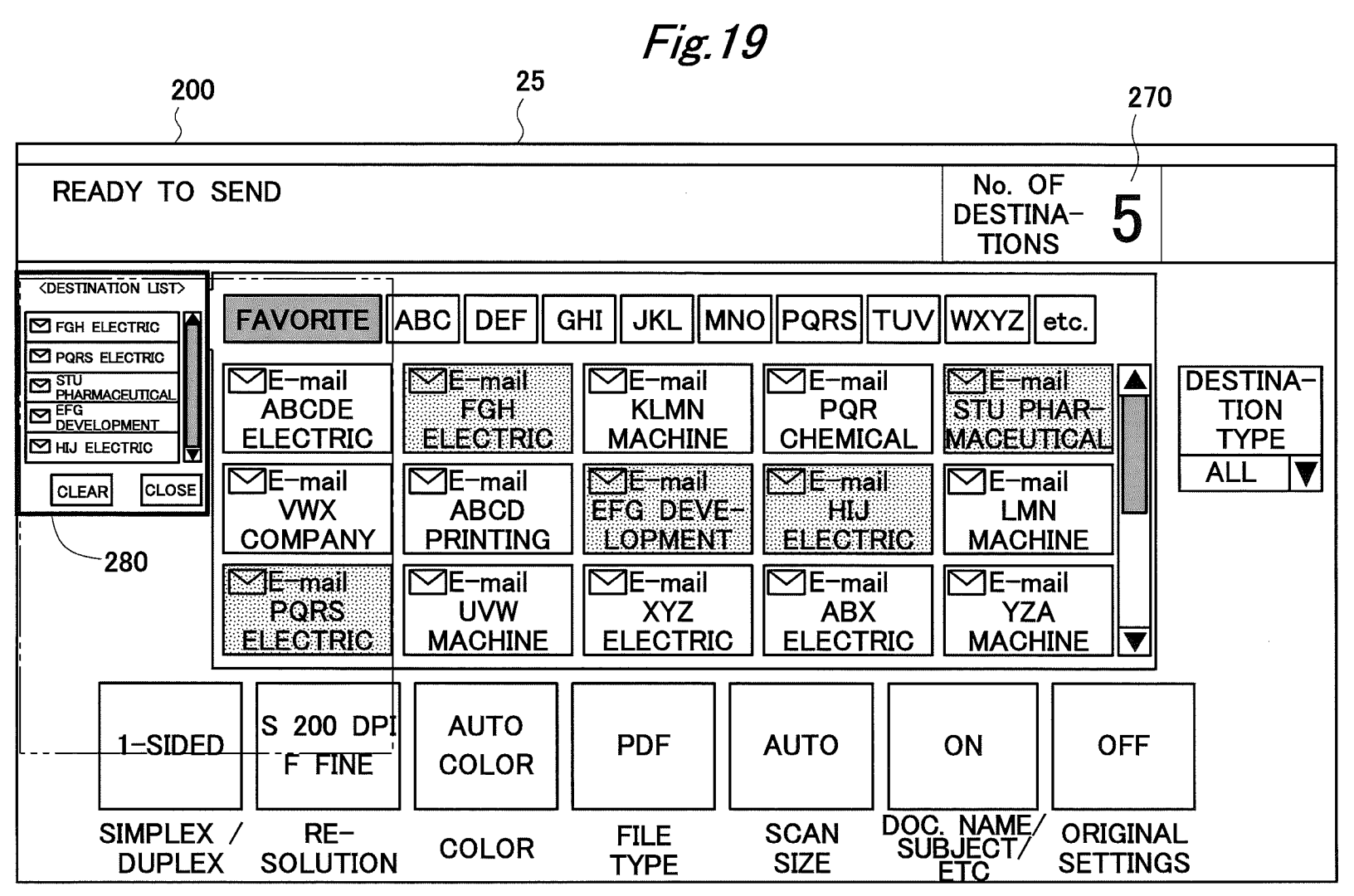

Though the exemplary case has been described herein where the destination list area 280 is arranged with its display size reduced, on the right end side inside the operation screen 200 in this case when the specified options are arranged in both the leftmost row and the rightmost row in the destination specifying area 250, the present invention is not limited to this case. When the specified options are arranged in both the leftmost row and the rightmost row in the destination specifying area 250, for example, as shown in FIG. 19, the destination list area 280 may be displayed with its display size reduced, on the left end side inside the operation screen 200 (in a left-side adjacent area of the destination specifying area 250 in FIG. 19).

Figure 20:
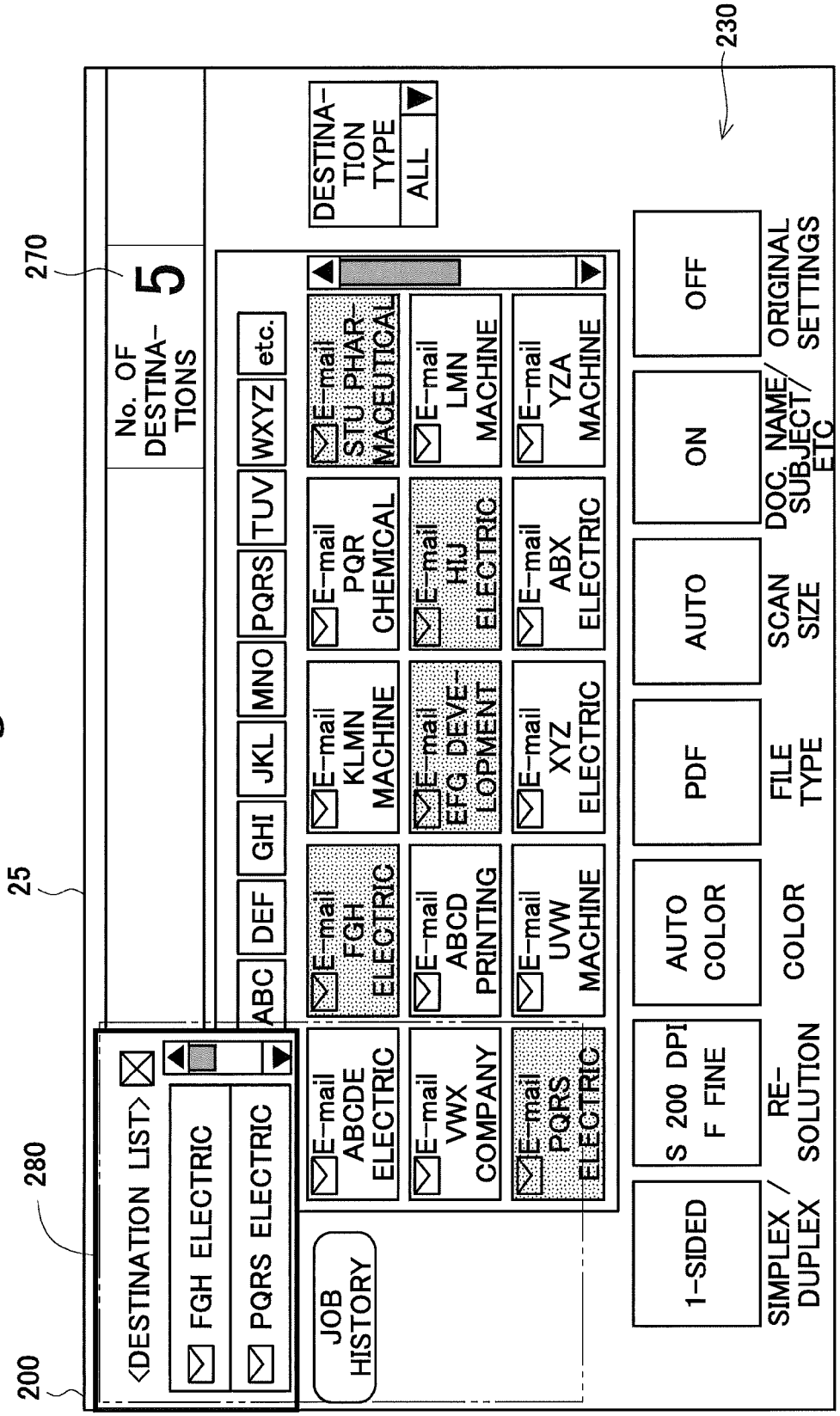

Though the exemplary case has been described herein where the display size of the destination list area 280 is reduced by downsizing the display content (including the characters indicating the destination, and the like) of the original destination list area 280 (before size-reduction), the present invention is not limited to this case. As shown in FIG. 20, for example, the display size of the destination list area 280 may be reduced by reducing the number of destinations to be displayed in the destination list area 280. In FIG. 20, the number of destinations displayed in the destination list area 280 is two, which becomes less than the number of destinations (five) displayed in the original destination list area 280. When the display size of the destination list area 280 is reduced by reducing the number of destinations to be displayed, the size of characters indicating each destination in the destination list area 280 does not need to be reduced (or reduction in character size can be confined to the minimum). Further, the destination list area 280 in FIG. 20 is so arranged on the upper side of the destination specifying area 250 as not to overlap the destination specifying area 250 in the operation screen 200. For this reason, it is possible to prevent each option inside the destination specifying area 250 from becoming hard to see. Further, the present invention is not limited to this case. Instead of the destination list area 280 shown in FIG. 20, the destination list area 280 may be so arranged on the lower side of the destination specifying area 250 (for example, over the detail setting call button 230) as not to overlap the destination specifying area 250.

Figure 21:
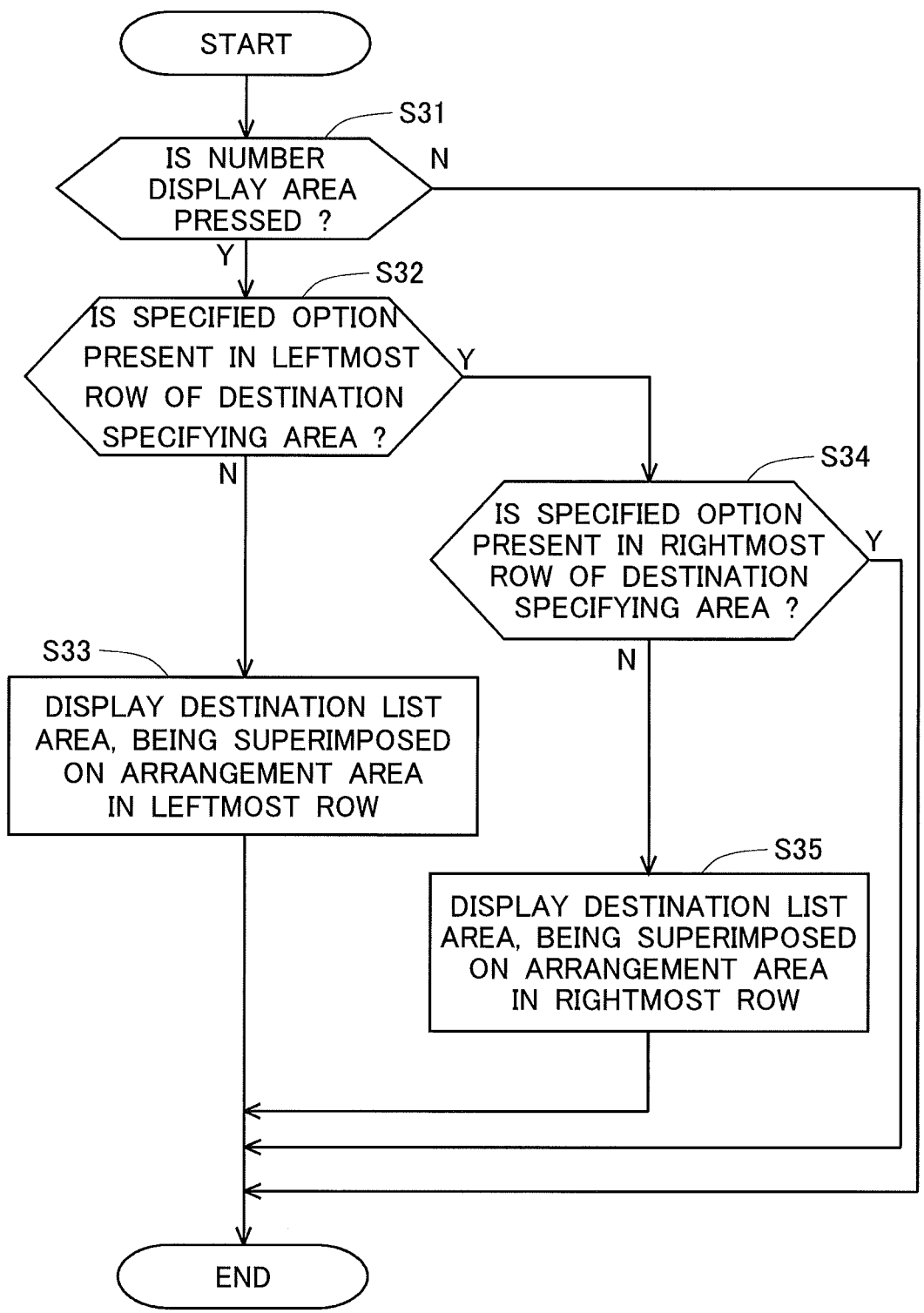
FIG. 21 is a flowchart showing an operation for displaying the destination list area, and the like, in accordance with a variation.

Further, though the exemplary case has been described herein where the destination list area 280 is displayed, with its display size reduced, in response to the user operation on the number display area 270 (in Step S34 (FIG. 16)) when the specified options are arranged in both the leftmost row and the rightmost row in the destination specifying area 250, the present invention is not limited to this case. When the specified options are arranged in both the leftmost row and the rightmost row in the destination specifying area 250, for example, even if the user operation on the number display area 270 is received, the destination list area 280 may not be displayed in the operation screen 200. In more detail, as shown in FIG. 21, when it is determined in Steps S32 and S34 that the specified options are arranged in both the leftmost row and the rightmost row in the destination specifying area 250, the Step S36 (FIG. 16) may not be executed so as not to display the destination list area 280.

Figure 22:
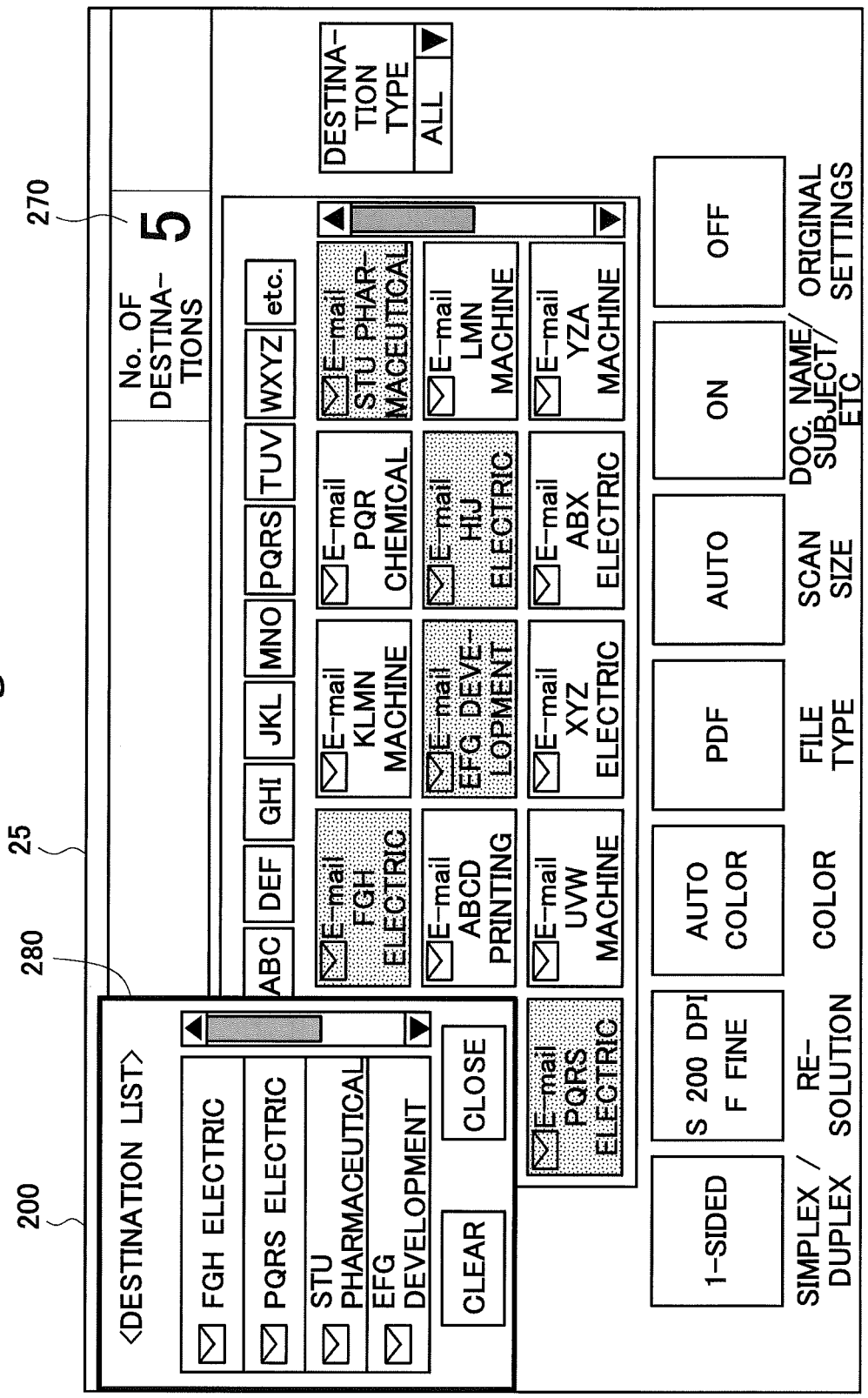
FIG. 22 is a view showing a destination setting screen in accordance with the variation.

Though the exemplary case has been described herein where the destination list area 280 is arranged by getting around the area in which the specified options are arranged in the destination specifying area 250 on a row basis (FIGS. 7, 17, and the like), the present invention is not limited to this case. For example, the destination list area 280 may be arranged by getting around the area in which the specified options are arranged in the destination specifying area 250 on a button area basis (see FIG. 22). In FIG. 22, among the three options in the leftmost row, the option on the lowest stage ("PQRS Electric") is a specified option and the options on the highest stage and the middle stage are unspecified options. In this situation, the destination list area 280 may be so arranged as to be superimposed on totally the two options on the highest stage and the middle stage in the leftmost row, while getting around the specified option ("PQRS Electric") on the lowest stage.

Further, though the exemplary case has been described herein where the destination list area 280 is arranged by getting around entirely the button area in which the specified options are arranged in the destination specifying area 250 (FIGS. 7, 17, and the like) when no specified option is arranged in one of the leftmost row and the rightmost row, the present invention is not limited to this case. For example, the destination list area 280 may be arranged by getting around the effective display area in which the specified option is arranged in the destination specifying area 250. In FIG. 17, for example, the destination list area 280 may be so displayed as not to cover the characters of the two specified options ("PQR Chemical" and "HIJ Electric") on the higher two stages in the second row from the right side and as to be superimposed also on a margin area on the right end side in the destination specifying buttons indicating the two specified options. It is thereby possible to check the specified options by using the destination specifying area 250 and the destination list area 280 while substantially not covering the specified options in the destination specifying area 250.

<5. The Fifth Preferred Embodiment>

The fifth preferred embodiment is a variation of the fourth preferred embodiment. Description will be made below, centering on the difference between the fourth and fifth preferred embodiments.

In the above-described fourth preferred embodiment, described is the case where the destination list area 280 is arranged by getting around the area in which the "specified options" are arranged in the destination specifying area 250.

In the fifth preferred embodiment, an exemplary case will be described, where the destination list area 280 is arranged in the operation screen 200 by getting around an area in which an "unspecified option" (an option which is not specified yet as a destination) is arranged in the destination specifying area 250 (in contrast with the fourth preferred embodiment). In short, the destination list area 280 is so arranged as not to overlap the unspecified options. More specifically, the destination list area 280 is arranged by using an area corresponding to one of the leftmost row and the rightmost row in the destination specifying area 250 which is arranged at a substantially central portion of the operation screen 200, in which no unspecified option is arranged, and an adjacent area thereof (an adjacent area adjacent to the outside (the left side or the right side) of the destination specifying area 250). Herein, the leftmost row among the leftmost row and the rightmost row is preferentially used, and the destination list area 280 is arranged therein.

Further, in the present invention, the "unspecified option" includes an option which is once specified as a destination but then the state of being specified is cancelled and is not specified again yet at a point in time when the number display area is pressed (the user operation on the number display area is performed). Since the "unspecified option" is an option which is not specified as a destination, it is also referred to as a "nonspecified option".

Figure 23:
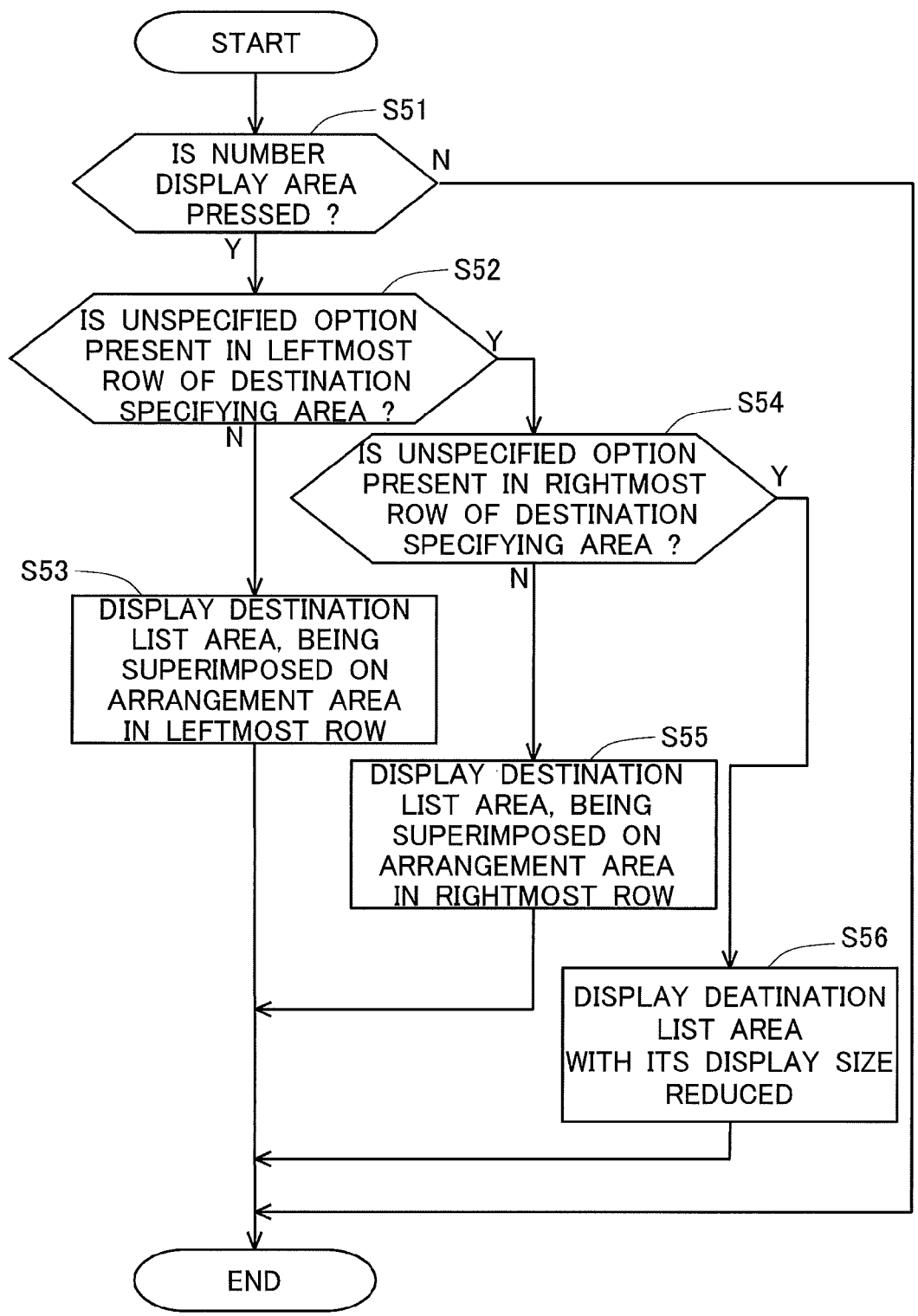
FIG. 23 is a flowchart showing an operation for displaying the destination list area, and the like, in accordance with a fifth preferred embodiment.

FIG. 23 is a flowchart showing an operation for displaying the destination list area, and the like, in accordance with the fifth preferred embodiment. In Step S51, the same determination process as that in Step S31 is performed. When the number display area 270 is pressed, the process goes from Step S51 to Step S52.

In Step S52, it is determined whether or not the unspecified options are arranged in the leftmost row of the destination specifying area 250.

When no unspecified option is arranged in the leftmost row of the destination specifying area 250, the process goes to Step S53, and the destination list area 280 is displayed, being superimposed on arrangement areas of the options in the leftmost row.

Figure 24:
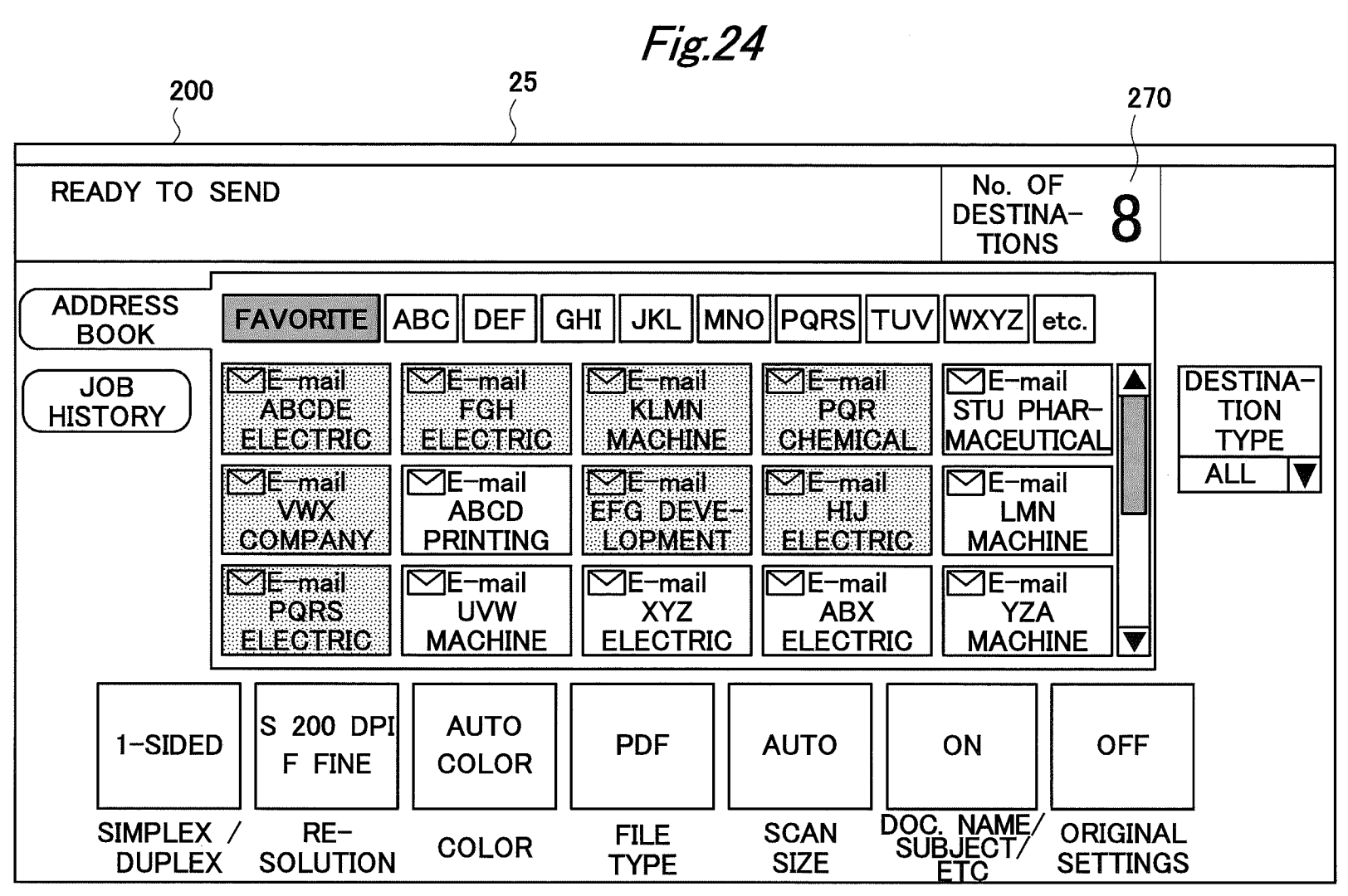
Figure 25:
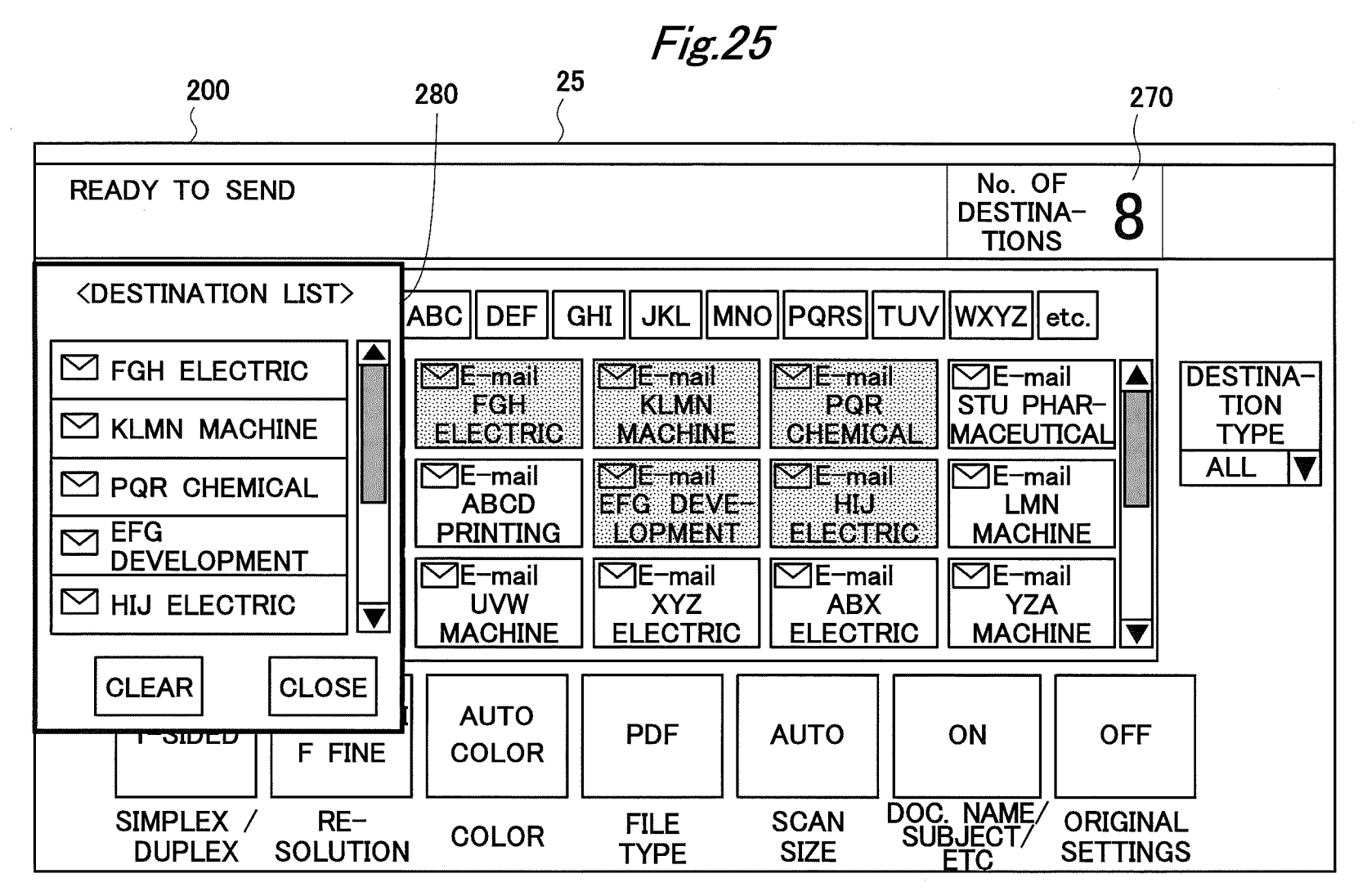

As shown in FIG. 24, for example, in a state where eight options (the options which are sand-hatched in FIG. 24), are selected, when the number display area 270 is pressed, the destination list area 280 is so displayed as to overlap the destination specifying buttons on the three stages in the longitudinal direction in the leftmost row, as shown in FIG. 25. In other words, the destination list area 280 is displayed by using an area (button arrangement areas in the leftmost row) where no unspecified option is arranged in the destination specifying area 250. In detail, the destination list area 280 is displayed by using option arrangement areas in the leftmost row and an adjacent area (adjacent area on the left side) adjacent to the destination specifying area 250 on the left end side.

Further, in FIGS. 24 and 25, two options ("ABCD Printing" and "UVW Machine") in the second row from the left side (in the fourth row from the right side), an option ("XYZ Electric") in the third row from the right side, an option ("XYZ Electric") in the second row from the right side, and three options in the rightmost row, i.e., totally seven options are shown as options which are not specified yet as destinations.

On the other hand, when an unspecified option is arranged in the leftmost row of the destination specifying area 250, the process goes from Step S52 to Step S54.

In Step S54, it is determined whether or not an unspecified option is arranged in the rightmost row (opposite side) of the destination specifying area 250.

When no unspecified option is arranged in the rightmost row of the destination specifying area 250, the process goes to Step S55, and the destination list area 280 is displayed, being superimposed on arrangement areas of the options in the rightmost row of the destination specifying area 250.

In other words, the destination list area 280 is displayed by using an area (a button arrangement area in the rightmost row) where no unspecified option is arranged in the destination specifying area 250. In detail, the destination list area 280 is displayed by using arrangement areas in the rightmost row and an adjacent area (adjacent area on the right side) adjacent to the destination specifying area 250 on the right end side.

On the other hand, when an unspecified option is arranged also in the rightmost row of the destination specifying area 250 (in other words, the unspecified options are arranged in both the leftmost row and the rightmost row of the destination specifying area 250), the process goes from Step S54 to Step S56. In Step S56, the destination list area 280 is displayed in the operation screen 200, with its display size reduced. At that time, the destination list area 280 may be displayed with its display size reduced in the same manner as that in the fourth preferred embodiment, in the variation, or the like.

Thus, in the fifth preferred embodiment, since the destination list area 280 is arranged by getting around the area (the central three rows, and the leftmost row or the rightmost row) where the unspecified options are arranged in the destination specifying area 250, it is possible to prevent the destination list area 280 from covering the unspecified options. Therefore, when the user finds an option which is an unspecified option and is to be originally specified in the destination specifying area 250 while referring to the destination list area 280, the user can easily specify the option as a destination by pressing the option (to be originally specified) in the destination specifying area 250.

Further, the same modifications as the above-described various modifications in accordance with the fourth preferred embodiment can be applied to the fifth preferred embodiment. More specifically, the same modifications as the various modifications in accordance with the above-described fourth preferred embodiment may be appropriately made by changing the "specified option" to "unspecified option".

<6. Variations>

Though the preferred embodiments of the present invention have been described above, the present invention is not limited to the above-discussed cases.

For example, a combination of the third preferred embodiment and the fourth preferred embodiment or the like may be performed. Specifically, in Steps S33, S35, and S36 (FIG. 16), the list display operation in accordance with the third preferred embodiment may be performed. Similarly, a combination of the third preferred embodiment and the fifth preferred embodiment or the like may be performed.

Further, a combination of the fourth preferred embodiment (or the fifth preferred embodiment) and the other preferred embodiments (for example, the first preferred embodiment or the second preferred embodiment) or the like may be performed. Specifically, between Steps S31 and S32 (see FIG. 16), the conditional branching operations in Steps S22 and S23 (see FIGS. 6 and 8) may be performed. In other words, whether to display the destination list area 280 may be determined on the basis of the conditions such as whether or not the number of specified destinations is not less than 1, whether or not any one of the specified destinations is displayed in the destination specifying area 250, and/or the like.

Furthermore, in the above-described preferred embodiments, though the exemplary case has been described where a plurality of options which are registered in advance are displayed in the destination specifying area 250, the present invention is not limited to this case. For example, the above-described various ideas may be applied in a case where a plurality of options which are automatically registered at any time as "history" (destination specifying history) in connection with the use of the MFP are displayed in the destination specifying area 250.

Further, though the MFP is shown as an example of the image transmission apparatus in the above-described preferred embodiments, the present invention is not limited to this case. The image transmission apparatus may be, for example, a facsimile-only device, a scanner-only device, or the like.

While the invention has been shown and described in detail, the foregoing description is in all aspects illustrative and not restrictive. It is therefore understood that numerous modifications and variations can be devised without departing from the scope of the invention.

What is claimed is:

1. An image transmission apparatus which transmits image data, comprising:
    an operation part displaying an operation screen and receiving a user operation on said operation screen; and
    a processor for controlling a display content in said operation screen,
    wherein said operation screen has:
    a destination specifying area used for displaying a plurality of options which are candidates of destinations of said image data and receiving a specifying operation for specifying said destinations by using said plurality of options; and
    a number display area used for displaying the number of said destinations specified by said specifying operation, and
    said processor displays a destination list area used for listing said destinations specified by said specifying operation, together with said destination specifying area and said number display area, in said operation screen under the condition that a specific operation which is an operation on said number display area is received.

2. The image transmission apparatus according to claim 1, wherein
    said processor does not display said destination list area in said operation screen, even if said specific operation is received, when the number of specified options which are options specified as said destinations by said specifying operation is zero.

3. The image transmission apparatus according to claim 2, wherein
    said processor displays said destination list area in said operation screen in response to said specific operation when the number of said specified options is not less than 1.

4. The image transmission apparatus according to claim 1, wherein
    said destination specifying area is capable of selectively displaying said plurality of options more than the maximum number of options which can be displayed at a time in said destination specifying area by scroll display, and said processor does not display said destination list area in said operation screen, even if said specific operation is received, when all of specified options which are options specified as said destinations by said specifying operation are displayed in said destination specifying area at the point in time when said specific operation is received.

5. The image transmission apparatus according to claim 4, wherein said processor displays said destination list area in said operation screen in response to said specific operation when at least one of said specified options is not displayed in said destination specifying area at the point in time when said specific operation is received.

6. The image transmission apparatus according to claim 1, wherein said processor preferentially displays an option which is not listed yet in said destination list area, among specified options which are options specified as said destinations by said specifying operation, when said destination list area once becomes non-displayed and then becomes displayed again.

7. The image transmission apparatus according to claim 1, wherein said processor displays said destination list area such that it does not overlap the destination specifying area, in which a specified option which is an option specified as one of said destinations by said specifying operation is arranged.

8. The image transmission apparatus according to claim 7, wherein said processor displays said destination list area by using areas in said destination specifying area, in which said specified option is not arranged.

9. The image transmission apparatus according to claim 8, wherein a predetermined number of options are displayed in said destination specifying area, being divided into a plurality of rows in a lateral direction, and said processor displays said destination list area by using an arrangement area of an option in a row of one end of said destination specifying area in said lateral direction and an adjacent area which is adjacent to said destination specifying area on the side of said one end when said specified option is not arranged in said row of said one end in said destination specifying area, and displays said destination list area by using an arrangement area of an option in a row of the other end of said destination specifying area in said lateral direction and an adjacent area which is adjacent to said destination specifying area on the side of said other end when said specified option is arranged in said row of said one end and said specified option is not arranged in said row of said other end of said destination specifying area in said lateral direction.

10. The image transmission apparatus according to claim 9, wherein said processor does not display said destination list area in said operation screen, even if said specific operation is received, when said specified option is arranged in each of said row of said one end and said row of said other end in said destination specifying area.

11. The image transmission apparatus according to claim 9, wherein said processor displays said destination list area in said operation screen while reducing a display size of said destination list area in response to said specific operation when said specified option is arranged in each of said row of said one end and said row of said other end in said destination specifying area.

12. The image transmission apparatus according to claim 11, wherein said processor displays said destination list area in said operation screen while reducing said display size of said destination list area to such a size as to avoid areas in which characters representing each option in said destination specifying area are arranged.

13. The image transmission apparatus according to claim 11, wherein said processor reduces said display size of said destination list area by downsizing a display content of said destination list area.

14. The image transmission apparatus according to claim 11, wherein said processor reduces said display size of said destination list area by reducing the number of said destinations to be displayed in said destination list area.

15. The image transmission apparatus according to claim 1, wherein said processor displays said destination list area such that it does not overlap the destination specifying area, in which a nonspecified option which is an option not specified as one of said destinations is arranged.

16. The image transmission apparatus according to claim 15, wherein said processor displays said destination list area by using areas in said destination specifying area, in which said nonspecified option is not arranged.

17. The image transmission apparatus according to claim 16, wherein a predetermined number of options are displayed in said destination specifying area, being divided into a plurality of rows in a lateral direction, and said processor displays said destination list area by using an arrangement area of an option in a row of one end of said destination specifying area in said lateral direction and an adjacent area which is adjacent to said destination specifying area on the side of said one end when said nonspecified option is not arranged in said row of said one end in said destination specifying area, and displays said destination list area by using an arrangement area of an option in a row of the other end of said destination specifying area in said lateral direction and an adjacent area which is adjacent to said destination specifying area on the side of said other end when said nonspecified option is arranged in said row of said one end and said nonspecified option is not arranged in said row of said other end of said destination specifying area in said lateral direction.

18. The image transmission apparatus according to claim 17, wherein said processor does not display said destination list area in said operation screen, even if said specific operation is received, when said nonspecified option is arranged in each of said row of said one end and said row of said other end in said destination specifying area.

19. The image transmission apparatus according to claim 17, wherein said processor displays said destination list area in said operation screen while reducing a display size of said destination list area in response to said specific operation when said nonspecified option is arranged in each of said row of said one end and said row of said other end in said destination specifying area.

20. The image transmission apparatus according to claim 19, wherein
said processor displays said destination list area in said operation screen while reducing said display size of said destination list area to such a size as to avoid areas in which characters representing each option in said destination specifying area are arranged.

21. The image transmission apparatus according to claim 19, wherein
said processor reduces said display size of said destination list area by downsizing a display content of said destination list area.

22. The image transmission apparatus according to claim 19, wherein
said processor reduces said display size of said destination list area by reducing the number of said destinations to be displayed in said destination list area.

23. A non-transitory computer-readable recording medium for recording therein a computer program to be executed by a computer embedded in an image transmission apparatus which transmits image data, to cause said computer to perform the steps of;
  a) displaying an operation screen on an operation part of said image transmission apparatus, said operation screen having a destination specifying area used for displaying a plurality of options which are candidates of destinations of said image data and receiving a specifying operation for specifying said destinations by using said plurality of options and a number display area used for displaying the number of said destinations specified by said specifying operation;
  b) receiving a specific operation which is an operation on said number display area; and
  c) displaying a destination list area used for listing said destinations specified by said specifying operation, together with said destination specifying area and said number display area, in said operation screen under the condition that said specific operation is received.

* * * * *